United States Patent
Weekes et al.

(10) Patent No.: US 11,628,933 B2
(45) Date of Patent: Apr. 18, 2023

(54) COMPOUND MULTI-COPTER AIRCRAFT

(71) Applicant: ELROY AIR, INC., San Francisco, CA (US)

(72) Inventors: Terik Weekes, San Francisco, CA (US); Sean Belardo, San Francisco, CA (US); Clint Cope, San Francisco, CA (US); Colin Owen, San Francisco, CA (US); David Merrill, San Francisco, CA (US)

(73) Assignee: ELROY AIR, INC., South San Francisco, CA (US)

( * ) Notice: Subject to any disclaimer, the term of this patent is extended or adjusted under 35 U.S.C. 154(b) by 365 days.

(21) Appl. No.: 16/172,470

(22) Filed: Oct. 26, 2018

(65) Prior Publication Data
US 2019/0127056 A1 May 2, 2019

Related U.S. Application Data

(60) Provisional application No. 62/610,659, filed on Dec. 27, 2017, provisional application No. 62/609,107, (Continued)

(51) Int. Cl.
*B64C 27/26* (2006.01)
*B64C 27/08* (2006.01)
(Continued)

(52) U.S. Cl.
CPC ............. *B64C 27/26* (2013.01); *B64C 27/08* (2013.01); *B64C 29/0025* (2013.01);
(Continued)

(58) Field of Classification Search
CPC ......... B64C 27/26; B64C 27/22; B64C 27/08; B64C 29/0025
See application file for complete search history.

(56) References Cited

U.S. PATENT DOCUMENTS

| 3,028,130 A | 4/1962 | Burton |
| 5,820,075 A | 10/1998 | Speakes |

(Continued)

FOREIGN PATENT DOCUMENTS

| DE | 202014004877 U1 | 7/2014 |
| EP | 2604519 A1 | 6/2013 |
| GB | 777593 A | 6/1956 |

OTHER PUBLICATIONS

Patent Cooperation Treaty Application No. PCT/US2018/057837, "International Search Report and the Written Opinion of the International Searching Authority", Applicant Elroy Air, Inc., dated Jan. 25, 2019.

(Continued)

*Primary Examiner* — Nicholas McFall
*Assistant Examiner* — Marisa V Conlon
(74) *Attorney, Agent, or Firm* — Martensen IP; Michael C. Martensen; Jack F. Stuart, II

(57) ABSTRACT

A compound aircraft embodies an array of rotors for vertical flight positioned on support booms and wing elements for cruise flight coupled to a central fuselage housing avionics and a pusher propeller for forward propulsion. The aircraft accommodates a cargo-carrying container with mating of the surfaces between container and fuselage and latching mechanisms for attaching and detaching the container and vehicle.

11 Claims, 14 Drawing Sheets

Related U.S. Application Data filed on Dec. 21, 2017, provisional application No. 62/578,254, filed on Oct. 27, 2017.

(51) Int. Cl.
  *B64C 29/00* (2006.01)
  *B64D 9/00* (2006.01)
  *B64C 39/02* (2006.01)
  *B64C 39/08* (2006.01)
  *B64C 39/12* (2006.01)
  *B64C 9/00* (2006.01)

(52) U.S. Cl.
  CPC ............ *B64C 39/024* (2013.01); *B64C 39/08* (2013.01); *B64C 39/12* (2013.01); *B64D 9/00* (2013.01)

(56) References Cited

U.S. PATENT DOCUMENTS

| | | | |
|---|---|---|---|
| 5,961,071 A | 10/1999 | Proctor | |
| 6,293,491 B1* | 9/2001 | Wobben | B64C 31/00 244/17.23 |
| 8,128,026 B2 | 3/2012 | Shelton | |
| 8,393,564 B2* | 3/2013 | Kroo | B64C 3/56 244/6 |
| 8,579,234 B2 | 11/2013 | Thompson | |
| 8,960,468 B2 | 2/2015 | Boivin | |
| 8,991,751 B2 | 3/2015 | Page et al. | |
| 9,550,567 B1 | 1/2017 | Erdozain, Jr. et al. | |
| 10,040,553 B2 | 8/2018 | Frolov et al. | |
| 10,059,442 B2 | 8/2018 | Olm et al. | |
| 10,364,036 B2* | 7/2019 | Tighe | B64D 27/24 |
| 2009/0014583 A1 | 1/2009 | Shelton | |
| 2013/0020429 A1 | 1/2013 | Kroo | |
| 2014/0048653 A1 | 2/2014 | Thompson | |
| 2015/0136897 A1* | 5/2015 | Seibel | B64C 29/0033 244/6 |
| 2016/0167776 A1* | 6/2016 | Shaw | B64C 39/024 244/7 R |
| 2016/0207625 A1 | 7/2016 | Judas | |
| 2016/0229534 A1 | 8/2016 | Hutson | |
| 2016/0236774 A1* | 8/2016 | Niedzballa | B64D 27/24 |
| 2017/0203842 A1 | 7/2017 | Viaud et al. | |
| 2017/0267347 A1 | 9/2017 | Rinaldi et al. | |
| 2017/0300065 A1* | 10/2017 | Douglas | G05D 1/0676 |
| 2017/0300067 A1 | 10/2017 | Douglas | |
| 2017/0313421 A1 | 11/2017 | Gil | |
| 2018/0305005 A1* | 10/2018 | Parks | B64D 27/24 |

OTHER PUBLICATIONS

Patent Cooperation Treaty Application No. PCT/US2018/057837, "International Preliminary Report on Patentability" Applicant Elroy Air, Inc., dated May 7, 2020.

Patent Cooperation Treaty Application No. PCT/US2018/067020, "International Search Report and the Written Opinion of the International Searching Authority", Applicant Elroy Air, Inc., dated Mar. 18, 2019.

Patent Cooperation Treaty Application No. PCT/US2020/027846, "International Search Report and Written Opinion of the International Searching Authority", Applicant Elroy Air, Inc., dated Sep. 23, 2020.

Patent Cooperation Treaty Application No. PCT/US2018/067020, "International Preliminary Report on Patentability" Applicant Elroy Air, Inc., dated Jun. 23, 2020.

* cited by examiner

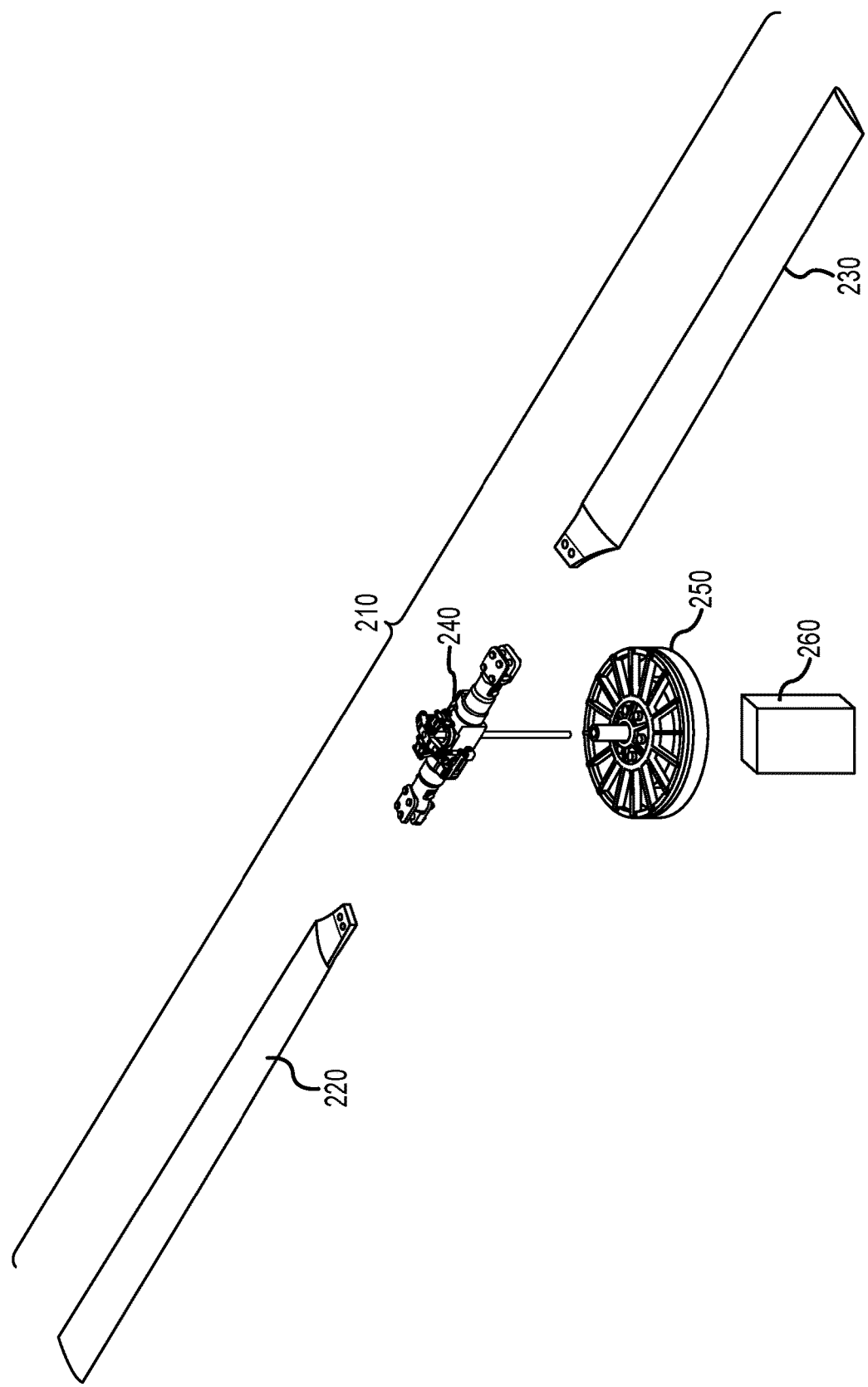

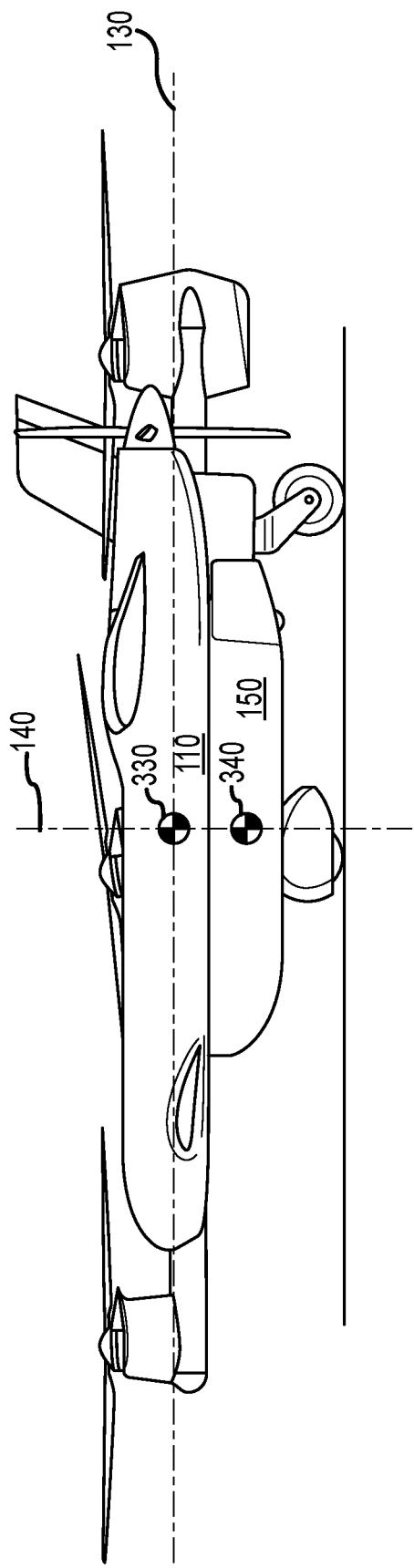
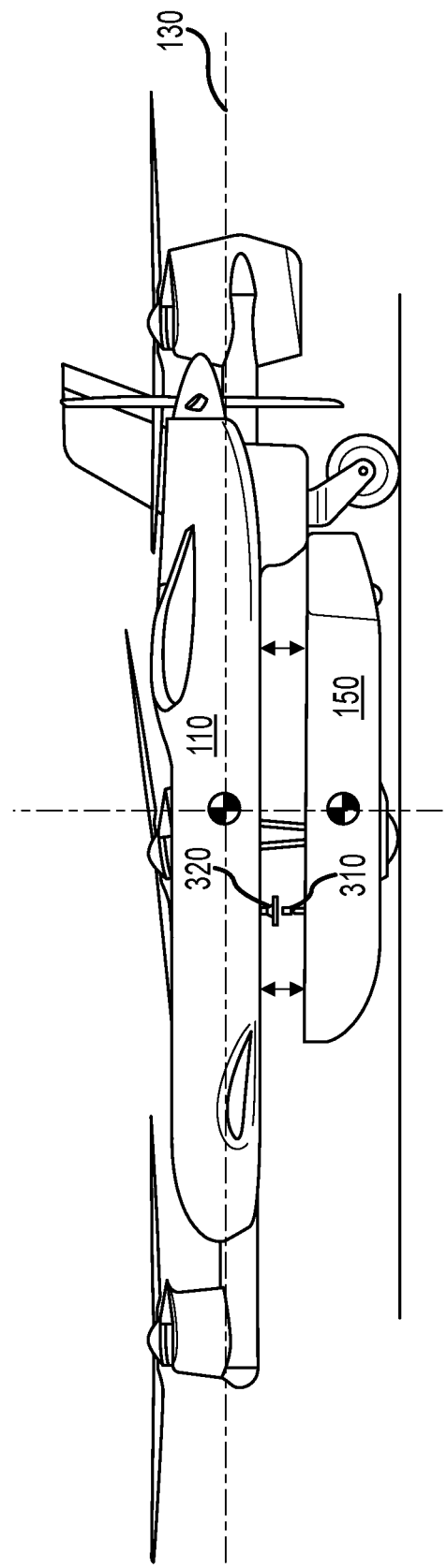
FIG.3A
FIG.3B

COMPOUND MULTI-COPTER AIRCRAFT

RELATED APPLICATION

The present application relates to and claims the benefit of priority to U.S. Provisional Patent Application Nos. 62/578,254, filed 27 Oct. 2017, 62/609,107 filed 21 Dec. 2017, and 62/610,659 filed 27 Dec. 2017 which are hereby incorporated by reference in their entirety for all purposes as if fully set forth herein.

BACKGROUND OF THE INVENTION

Field of the Invention

The invention pertains to unmanned aerial vehicles and more particularly to compound aerial vehicles having both wing and rotor elements.

Relevant Background

Traditional airplane designs use wings as primary lift surfaces. This is efficient and allows them to fly long distances while maximizing their use of stored energy. A limitation of traditional airplanes is that they require a runway for takeoff and landing. This ground infrastructure requirement limits the locations where airplanes can take off and land. On the other hand, rotorcraft such as helicopters and multi-copters do not require runway infrastructure since they feature Vertical TakeOff and Landing (VTOL). With the advantage of VTOL capability comes a cost: traditional rotorcraft are less energy efficient than similarly sized airplanes, they require more costly maintenance, and they typically fly more slowly—factors that limit their effective range and increase operating costs.

Other VTOL systems may launch in the vertical flight regime and make the transition to the powered flight regime and vice versa. However, many of those aircraft have systems that vector thrust. Vectored thrust represents an increase in aircraft complexity, parts count and thus cost. Additionally, thrusters used to hover the aircraft at zero airspeed may be inefficient at cruise, hover, or both speeds. Lower efficiency negatively affects overall vehicle performance. A "compound" aircraft design is one with both rotor and wing elements. Typically, such a vehicle uses rotors for generating lift for a vertical takeoff and landing, and wing surfaces for generating lift during "cruise"—the forward part of a flight. Forward propulsion of the compound vehicle during cruise may come from a dedicated propeller or set thereof, or via the same rotors that are used for lift, rotated such that they propel the aircraft forward.

The concept of an aircraft with both VTOL and cruise modes promises a "best of both worlds" possibility that has been appealing to aerospace engineers for more than 80 years. In 1938 Leslie Everett Baynes, an English aeronautical engineer designed and patented first VTOL swivel turbine 'Heliplane'. The V22-Osprey, a popular heavy-lift aircraft used today by armed forces and having tilting rotor-pods and wing elements took its first flight in March 1989.

Compound aircraft designs have received increased attention recently as a practical approach to both Unmanned Aerial Vehicles (UAVs) and so-called "air taxi" aircraft designs for manned flight. The appeal is the same as it has always been: from rotorcraft these vehicles inherit the convenience of vertical takeoff and landing and therefore do not rely on specialized airport infrastructure, and from airplanes they gain the capability of longer-range energy-efficient flight.

The unique advantages of compound aircraft have become timely as interest grows to put air transport to work in new ways, using new fuel sources and autonomous navigation systems. Specifically: while potentially at the cusp of an era of electric aviation, the energy density of batteries still trails far behind liquid fuel. The advantage of flexible takeoff and landing zones (many of which may not be traditional airports) must be harmonized with the requirement to keep aircraft weight minimized and support longer-range missions. Compound aircraft offer a solution to this tension in the aircraft design space, a potential "best of both worlds" solution. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A compound aircraft embodies an array of rotors for vertical flight positioned on support booms and wing elements for cruise flight coupled to a central fuselage housing avionics and a pusher propeller for forward propulsion. The aircraft of the present invention further accommodates a cargo-carrying container with mating of the surfaces between container and fuselage and latching mechanisms for attaching and detaching the container and vehicle.

One embodiment of the present invention is a "compound" aircraft, that is, an aircraft capable of both cruise and vertical flight modes. A pusher-propeller, along with fore and aft fixed wings, provide a cruise flight mode, and a rotor-lift system provides a vertical flight mode. The rotor-lift system is an array of rotors positioned on support booms (the support booms are positioned parallel to and equidistant from a fuselage) to provide vertical flight. Wing elements coupled to the fuselage—along with a pusher propeller housed within the fuselage—provide cruise flight. The fuselage also houses avionics and other payloads, as space permits.

This compound aircraft also accommodates a cargo-carrying container, and the cargo-carrying container and the compound aircraft each have complementary surfaces that mate to one another (i.e., the surfaces match each other like 3D puzzle pieces), well as latching mechanisms which attach the container to (and detach the container from) the compound aircraft.

The fuselage includes a front portion and a rear portion, as well as a longitudinal axis which extends through the front portion and the rear portion. A first support boom is coupled to the fore and aft fixed wings and a second support boom is likewise coupled to the fore and aft fixed wings, with both booms being equidistant from and parallel to the fuselage, which is also parallel to the longitudinal axis.

The two flight modes are distinguished as follows: For essentially-vertical lift, a rotor array is distributed along the first support boom and the second support boom. The rotor array provides substantially vertical thrust, and a cruise propeller is positioned at the rear portion of the fuselage and configured to provide thrust substantially aligned with the longitudinal axis for cruise flight.

The compound aircraft can be manned or unmanned, but in either case the fuselage includes a mounting system configured to couple the fuselage to a detachable cargo container. The aircraft's center of gravity remains substantially unchanged when the detachable cargo container is attached to or detached from the mounting system.

To control cruise flight, a number of flight control surfaces are used. For example, for directional stability the fuselage includes a ventral fin. Additionally, a canard (which is a type of forward wing, or "forewing") is coupled to the lower portions of the fuselage, the first support boom and the second support boom to provide stall resistance and controllability throughout the flight envelope. The wing, which has an anhedral angle greater than zero, is mounted on an upper portion of the fuselage, and both the wing and the canard include control elements for cruise flight. There is a vertical stabilizer on each wing tip which contributes to directional stability. Each wing-tip includes a rudder which is used for directional control. The rotor array provides alternative-flight control for cruise flight. Each support boom includes an additional stabilizer.

To control vertical flight the rotor array includes a plurality of rotors and each rotor is associated with a rotor drive system. In one embodiment each rotor includes a mechanism to change rotor pitch angle while in a different version of the present invention the rotors are fixed pitch. Each rotor drive system includes a motor and a motor controller. Each motor is coupled to a battery and, in another embodiment, a generator. The rotor array includes a first plurality of motors mounted on the first support boom and a second plurality of motors mounted on the second support boom. The rotor array includes a plurality of rotor pairs (a "pair" being a first rotor from one boom and a second rotor corresponding on the other boom). Each rotor is tilted away from a vertical axis of the aircraft, the vertical axis being perpendicular to the lateral axis and the longitudinal axis, and each rotor in a rotor pair is tilted away from the vertical axis at the same angle as the other rotor. In one embodiment the rotors in a rotor pair are tilted at an angle mirrored across the longitudinal plane from the other rotor. The rotors of each rotor pair are tilted at different angles from the angles of the rotors in the other rotor pairs.

Each rotor and each rotor drive system of the rotor array is independently controlled by a flight control system, and the rotational position of each rotor is likewise controlled by the flight control system, so that the aircraft remains operational if two or less rotors in the rotor array fail.

In transition from vertical to cruise flight, each rotor is associated with a sensor identifying the rotor's position, and the rotation of each rotor in the rotor array is stopped and its angle of rotation is locked ("clocked") so that each rotor propeller is aligned to be parallel to the longitudinal axis. Each rotor is held in position by its rotor drive system.

The aircraft's unique hybrid power system saves weight over conventional power schemes, increasing the aircraft's range and efficiency. For essentially vertical lift the first plurality of motors are mounted along a first axis parallel with the longitudinal axis and the second plurality of motors are mounted along a second axis parallel with the longitudinal axis. Each rotor in the array is either a fixed or variable-pitch rotor. For cruise flight the pusher propeller is driven by a liquid-fuel engine ("engine") and is either a fixed or variable-pitch propeller. An optional clutch, configured to engage and disengage the engine-driven propeller, is interposed between the propeller and the engine. The power produced by the engine sustains the aircraft in cruise flight but the thrust from the engine cannot be used for vertical flight; additionally, the power from the generator attached to the engine is not sufficient to exclusively power the rotor array in vertical flight with margins appropriate for regular operation. (i.e., altitude change is possible using the aircraft's wing and canard control elements to climb and descend, but a purely vertical positional translation using engine power alone—that is, solely using the engine's propeller—is not possible). The engine is coupled to a generator configured to provide electrical energy to a battery management system, which in turn recharges the battery system.

Note that the aircraft can operate independent of the battery system (engine+generator only, in cruise flight) for a limited period of time: The thrust developed by the rotor array is distinct from the thrust developed by the engine's propeller, in that the rotors of the rotor array are each driven by an independent electric motor, where the engine's propeller is driven by, in one embodiment, an engine or, in another embodiment, a motor. A flight control system is configured to transition the aircraft from vertical flight to cruise flight and from cruise flight to vertical flight, clocking the rotor array rotors parallel to the longitudinal axis for minimum drag in cruise flight.

Another embodiment of the present invention is an aircraft capable of fixed-wing and rotor-based flight modes. A multi-rotor system sustains the aircraft in a vertical flight mode and a liquid-fuel engine ("engine") sustains the aircraft in a cruise flight mode. The multi-rotor system includes a first plurality of rotor motors mounted on the first support boom and a second plurality of rotor motors mounted on the second support boom. The multi-rotor system also includes a plurality of rotor pairs and each rotor pair is tilted away from a vertical axis (the vertical axis being perpendicular to a lateral axis—the lateral axis is perpendicular to the longitudinal axis and extends from the fuselage, substantially parallel to the canard and the wing) and wherein each rotor pair of the multi-rotor system is tilted a different direction. The combination of the multi-rotor system and the engine is optimized for hover and cruise operations through a flight control system configured to transition the aircraft from the vertical flight mode to the cruise flight mode and from the cruise flight mode to the vertical flight mode.

Each rotor of the multi-rotor system has a pitch-varying mechanism configured to provide thrust sufficient to sustain the aircraft in the vertical flight mode with aid from the engine and generator. The engine drives a propeller configured to provide thrust sufficient to sustain the aircraft in the cruise flight mode without aid from the multi-rotor system. The engine is coupled to a generator which is configured to provide energy to a battery management system and/or directly to the multi-rotor system.

The aircraft includes a fuselage and a wing coupled to the fuselage. The fuselage includes a front portion and a rear portion and includes a longitudinal axis extending through the front portion and the rear portion. A first support boom is coupled to the wing and a second support boom is likewise coupled to the wing. The fuselage is positioned equidistant between the first support boom and the second support boom, and the fuselage includes a mounting system configured to couple to a detachable cargo container. Like all aircraft, the aircraft has a center-of-gravity and the detachable cargo container likewise has its own center-of-gravity, but the aircraft's center-of-gravity remains substantially unchanged when the detachable cargo container is attached to or detached from the mounting system. A canard is also coupled to the fuselage, the first support boom and the second support boom.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 2 is an exploded view of one of the plurality of rotors according to one embodiment of the present invention;

FIGS. 3A to 3D show a high-level view of the central fuselage of the compound aircraft and an associated cargo container, according to one embodiment of the present invention;

Figure 1:
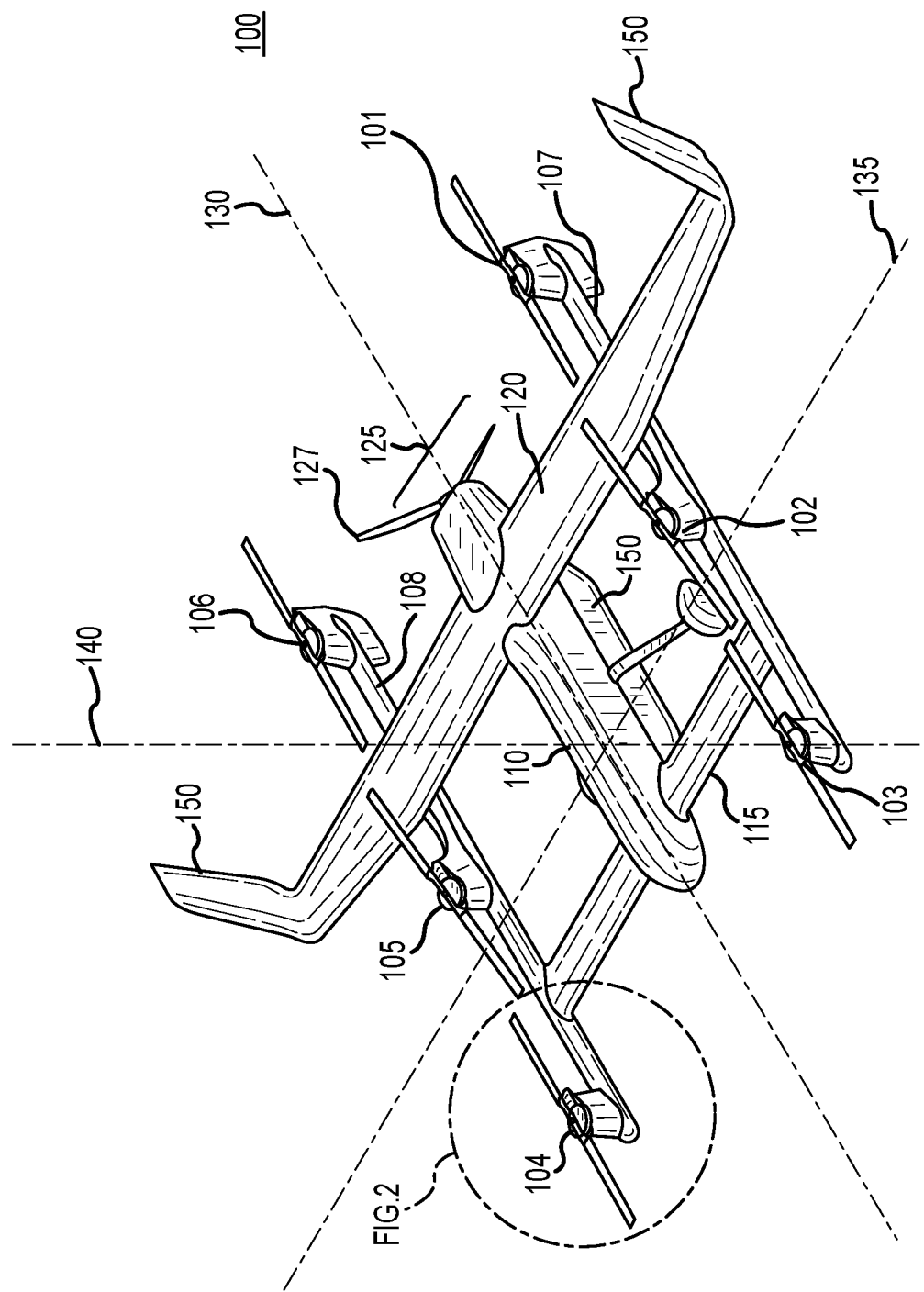
FIG. 1 shows a perspective view of a compound multi-rotor aircraft according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

A compound aircraft embodying an array of rotors enabling vertical flight combined with lifting surfaces and a thrust source for cruise flight is hereafter described by way of example. Embodiments of the present invention include an Unmanned or autonomous Aerial Vehicle (UAV) that departs a location vertically using a rotor array and thereafter transitions to a cruise flight mode supported by conventional lifting surfaces and propulsion. The compound aircraft of the present invention further includes a detachable cargo container coupled to the fuselage at a supply depot or the like and thereafter transported to a distant location where it is autonomously detached.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal," "cruise" and the like are used herein for the purpose of explanation only unless specifically indicated otherwise.

FIG. 1 shows a perspective view of a compound aircraft 100 combining a rotor array for vertical flight with wing elements and a propulsion system for cruise flight. In one embodiment of the present invention a plurality of rotors 101-106 are positioned among two support booms 107, 108 that are laterally displaced from a central fuselage 110. Each support boom 107, 108 is coupled to the fuselage 110 by a canard 115 in the forward portion of the aircraft and a wing 120 in the rear portion of the aircraft. According to one embodiment of the present invention, a liquid-fuel driven propulsion system 125 is located in the rear portion of the aircraft in a pusher configuration.

As shown in FIG. 1, the pusher propeller 127 and propulsion system 125 is aligned with the longitudinal axis 130 of the aircraft 100 which bisects the aircraft from the front to the rear along the centerline of the fuselage 110. Similarly, a lateral axis 135, perpendicular to the longitudinal axis 130, extends from the fuselage and is substantially parallel with the canard and the wing. A vertical axis 140, orthogonal to the lateral 135 and longitudinal 130 axis, is aligned with the vertical flight controls and vertical stabilizers 150.

As with most conventional aircraft having a canard configuration, the canard 115, wing 120 and vertical stabilizers 150 each possess flight controls (not shown) to manipulate and control aircraft when it is in a cruise flight mode. In the present embodiment the vertical stabilizers are blended into the wingtips of the wing 120 but one of reasonable skill in the relevant art will appreciate that other configurations are possible without departing from the scope and intent of the present invention.

A centrally located cargo container 150, as shown in FIG. 1, is coupled to the lower portion of the fuselage 110. The cargo container 150 is a detachable component that can be loaded with cargo, attached to the aircraft, transported to a distant location, and deposited. The Vertical TakeOff and Landing (VTOL) capability of the compound aircraft of the present invention enables cargo to be delivered and retrieved from austere locations and small landing zones just slightly larger than the aircraft itself while the conventional canard/wing configuration utilizing passive lift surfaces during cruise flight provides the means to transport the cargo significant distances.

The compound aircraft of the present invention includes a rotor array for vertical flight. In one embodiment of the present invention, and as shown in FIG. 1, each rotor of a plurality of rotors is positioned on support booms. In this embodiment, the support booms 107, 108 are equidistant from the fuselage 110 and parallel with the longitudinal axis 130. The first support boom and the second support boom are each coupled to the canard 115 and wing 120 which in turn joins each boom 105 to the fuselage 110.

In the embodiment of the present invention shown in FIG. 1, the rotor array comprises 6 rotors 101-106. Three rotors 101-103 are associated with the first support boom 107 and three rotors 104-106 are associated with the second support boom 108. In this configuration there are two forward rotors 103, 104, one on the first support boom 107 fore of the canard 115, and one on the second support boom 108, fore of the canard 115 forming a forward rotor pair. A second, central, pair of rotors 102, 105 is posited between the canard 115 and the wing 120, one being on the first support boom 107 and the second being on the second support boom 108. Lastly, a rear pair rotors 101, 106 is positioned aft of the trailing edge of the wing 120 with one rotor on the first support boom 107 and a second on the second support boom 108.

While the rotor placement shown in FIG. 1 is depicted as being evenly distributed along the respective support booms, the placement of each rotor relative to the other rotors is not necessarily uniform. One of reasonable skill in the relevant art will appreciate that placement of the rotors along the boom is a dictated by a myriad of factors. Indeed, the distance between the forward rotor pair and the central rotor pair may not equal the distance between the central rotor pair and the rear rotor pair. And while FIG. 1 depicts each rotor pair as being symmetrically positioned along an axis parallel to the lateral axis of the aircraft, other configurations in which the placement of the rotors is not symmetrical is contemplated and within the scope of the present invention.

The present invention is a compound fixed wing aircraft in a canard configuration combined with a VTOL platform having a plurality of rotors. The fixed wing portion of the aircraft includes a canard, a wing, vertical stabilizers and a propulsion system. Landing gear suitable for VTOL operations, fixed wing takeoff, landing, and/or ground operations are also included. In one embodiment of the present invention, and as depicted in FIG. 1, the fixed wing portion of the compound aircraft is propelled by a liquid-fuel driven engine and an associated pusher propeller. While optimized for the current embodiment, other configurations and placement of the source of thrust are contemplated. The present invention combines an optimal configuration for fixed wing flight with that of a VTOL capability. As one of reasonable skill in the relevant art will appreciate, other configuration of the wing, canard, propulsion system, rotors and the like are possible (and contemplated) without departing from the scope and spirit of the present invention.

Each rotor is associated with a rotor drive system. FIG. 2 shows an exploded view of a representative rotor and its rotor drive system as associated with a support boom. In one embodiment of the present invention each rotor 21 includes variable pitch actuation. Variable pitch actuation allows for longer blades 220, 230 with greater mass as compared to a fixed pitch system. As will be appreciated by one of reasonable skill in the relevant art, a fixed pitch rotor system requires comparably lower rotor-mass in order to retain sufficient control authority by using modulated revolutions per minute. By using a variable-pitch rotor system, longer blades can be utilized providing lower disk loading. The result is an optimized more efficient system. In other embodiments a fixed pitch rotor system, or combination thereof, is utilized to offer versatility and simplicity. The tradeoff for using a fixed pitch system is thrust responsiveness. With a fixed pitch system modulation in thrust is directly tied to revolution speed. Adjustments to the speed of the rotors is linked to torque delivered by the motor and the weight of the rotor. In some instances, a large, high mass rotor may have a substantial delay in modulating a thrust requirement. This delay is minimized by utilizing a variable pitch design, but with the added cost of complexity and weight. Both approaches are contemplated by the present invention.

Each rotor, in one embodiment, includes redundant actuators 240 for controlling the pitch of the blades 220, 230. In the case of failure, a single actuator can maintain blade pitch control thereby increasing the aircrafts reliability and durability. The system can compensate for a lost rotor with a change in the collective trim, control mixing and in some cases an increase in rotor rotational rate.

In another embodiment of the present invention each rotor possesses a variable pitch capability but not a cyclic. The cyclic, often called the stick by pilots, is a control positioned vertically in front of a pilot in a traditional helicopter. The cyclic is used to change the attitude and airspeed of the helicopter by altering the attitude of what is called the rotor disc, i.e., the hypothetical 'disc' the rotors make when they are turning.

A cyclic control input changes the mechanical pitch angle of each rotor blade independently, depending on its position in the cycle. The pitch is changed so that each blade will have the same angle of incidence as it passes the same point in the cycle, changing the lift generated by the blade at that point and causing each blade to fly up or down in sequence as it passes the same point. If the pilot pushes the cyclic forward, the rotor disc tilts forward. If the pilot pushes the cyclic to the right, the rotor disc tilts to the right.

By comparison a collective control input changes the pitch angle of the rotor blades collectively (i.e., all at the same time) and independent of their position. Therefore, if a collective input is made, all the blades change equally, and as a result, the rotor increases or decreases its total lift derived from the rotor.

While the pitch of the rotors, in one embodiment of the present invention, are varied, the attitude of the rotor disc is fixed. In other embodiments, each rotor includes not only a means of varying blade pitch, but also a cyclic control to modulate the attitude of the rotor disc. Using the blade-pitch controls found with each rotor in the rotor array, the present invention can absorb loss of one or more rotors by changing the collective trim and mixing of the remaining rotors and/or modulating individual rotor rotation rate. In other embodiments a fixed pitch rotor is used and thrust is varied based on rotation rate. And in yet another embodiment, the rotors are allowed to independently articulate or flap while in another versions mechanisms are employed to manipulate the pitch of each blade commensurate with forward velocity to minimize or control retreating blade stall.

As previously stated, each rotor is associated with a rotor drive system. According to one embodiment of the present invention, a rotor, and the blade pitch actuators, are each coupled to a motor 250 and a motor controller 260. The motor is electrically driven and in turn powered by a battery managed by a battery management system. In other embodiments the motor and battery are further associated with a cooling system. Electric motors, and batteries as they charge and discharge, produce a significant amount of heat. Embodiments of the present invention incorporate a cooling system to maintain optimal performance of both the motor and the battery system.

The rotor drive system includes a motor controller for each rotor that is directly responsible for driving the motor to turn the rotor. In one embodiment the rotor is directly linked to the motor with no gearbox. In other embodiments, a transmission (gearbox) configuration is interposed between the motor and the rotor to apply positive or negative gain to the rotor speed. In the current embodiment the motor controller manages blade rotation rate by modulating the supply of electrical power to the motor from the battery.

The present invention uses, according to one embodiment, a hybrid powertrain. Liquid fuel provides a higher energy density that current battery packs, so an optimal design stores the majority of onboard energy as liquid fuel. A multi-rotor system is more optimally powered by electrical power given the lower system complexity and weight of distributing electrical power versus mechanical power, so the rotor array of the present invention is driven by electric motors. The power used to drive each of the rotor motors is provided, in one embodiment, by both onboard batteries and a generator coupled to a liquid-fuel engine. A hybrid powertrain could power vertical flight from batteries alone, however by combining electrical power generated by a generator coupled to the liquid-fuel engine with electrical power from batteries, a smaller battery pack is sufficient to enable vertical flight, decreasing overall weight of the aircraft and resulting in an optimized design. According to one embodiment of the present invention, a hybrid approach is used where the power used to drive each of the motors is provided by both onboard batteries and a generator coupled to a liquid-fuel engine which captures the best of both worlds.

In one embodiment of the present invention the rotor array (VTOL lift system) is powered by energy stored in onboard batteries managed by the battery management system. As the aircraft transitions to cruise flight and is driven by thrust generated by the liquid-fuel engine, a generator coupled to the battery management system, provides energy to recharge the batteries. In another embodiment, the rotor array is directly powered by the generator of the liquid-fuel engine. In yet another embodiment of the present invention, the rotor array is powered by both energy stored in onboard batteries and energy generated by a generator coupled to a liquid-fuel engine. Lastly, each mode of powering the rotor array is not exclusive. It is possible, and indeed contemplated, that the source of energy driving the motors of each rotor in the array may vary based on flight conditions. In one instance battery power alone may be sufficient and indeed optimal to power the aircraft in a vertical flight mode. In another instance it may be optimal for the rotor array to be powered solely by energy generated by a generator driven by a liquid-fuel engine. And in yet another instance is may be optimal for the rotors of the rotor array to be powered by energy delivered by both onboard batteries and a generator coupled to a liquid-fuel engine. Indeed, it is contemplated that the aircraft may transition through several of these hybrid power instances in a single flight.

Just at the rotor array may be powered by onboard batteries and/or energy generated by a liquid-fuel engine, the propulsion system that provides thrust for a cruise flight mode may also be provided by a motor driven from energy stored in onboard batteries. And, as with the rotor array, these batteries may be recharged in flight by a liquid-fuel engine that drives a generator. In another embodiment, the propulsion system may be powered directly by energy generated by a generator coupled to a liquid-fuel engine. And, as with the rotor array, the propulsion system may use a combination of energy supplied by onboard batteries and energy generated by a generator coupled to a liquid-fuel engine. Lastly, one embodiment of the present invention recognizes the efficiency of liquid-fuel engine as a direct source of thrust for a cruise flight mode and may include an inline clutch to engage or disengage the propeller from the engine. Accordingly, one embodiment of the present invention uses the liquid-fuel engine to independently drive the propulsion system for cruise flight.

A unique feature of the present invention is the cooperative features of rotor (vertical) and wing-based (cruise) flight modes. In VTOL operations, the rotor array provides all lift necessary for vertical flight operations. And in a cruise flight mode, the wing and canard, in combination with thrust provided by the cruise propulsion system, provides all lift necessary for cruise flight operations. In transition lift is produced by the rotor array as well as the wing and canard. In this intermediate phase of flight, the aircraft of the present invention can fly slower than a normal fixed wing configured aircraft and can operate with longer endurance than would be possible in an all rotor powered flight configuration. In addition to compound VTOL and cruise flight mode operations the configuration of the rotor array enables the aircraft to precisely maneuver in a variety of environments to execute precise takeoff and landing procedures.

Figure 3C:
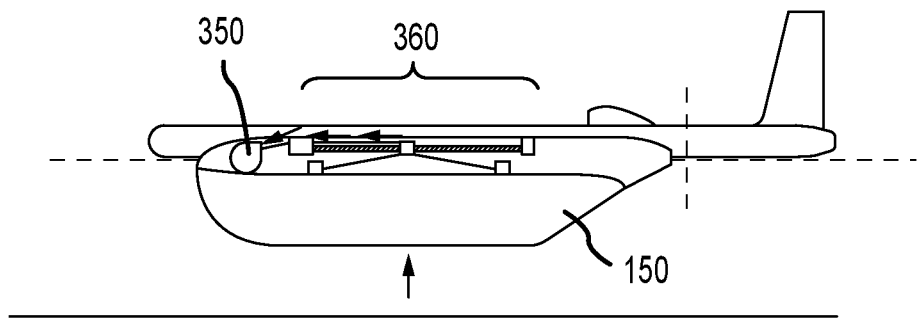
Figure 3D:
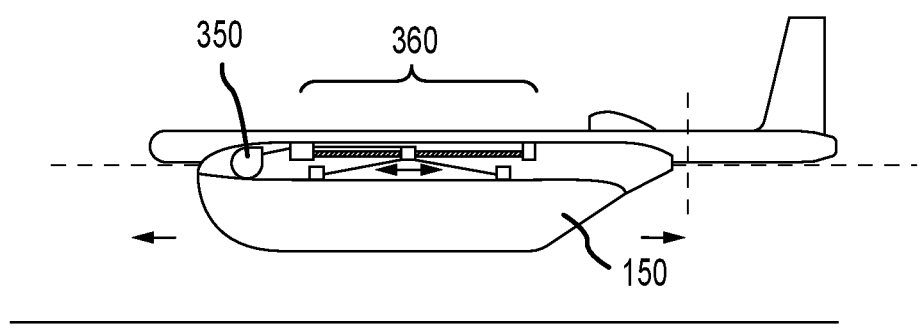

FIG. 3A and 3B show a side view, according to one embodiment, of the fuselage of the compound aircraft of the present invention, with its detachable cargo container attached. The compound aircraft of the present invention is configured to deliver cargo to distant locations. And in another mode of operations, the compound aircraft of the present invention can travel to distant locations and autonomously retrieve a cargo container. In one embodiment of the present invention, the cargo container 150 couples to the lower portion of the fuselage 110 using a releasable bracket 310. As one of reasonable skill in the relevant art will appreciate, the location of the center of gravity is an important consideration for any aircraft. The center of gravity 330 of an aircraft is the point at which the aircraft's longitudinal, lateral and vertical axis intersect. And while the center of lift, (the point where the sum total of all lift generated by lifting surfaces such as the wings, canard, and rotors act) may vary and not be coincident with the center of gravity 330, the position of the center of gravity with respect to the center of lift is important. Indeed, aircraft have definite limits with respect to the location of the center of gravity to ensure that the aircraft can remain controllable in all phases of flights. FIG. 3C and 3D show another side view, according to one embodiment, of the adjustment mechanism for the adjustment of the detachable cargo container's position along the aircraft's longitudinal axis. A winch 350 is used in concert with an adjustment apparatus 360 to position the cargo container 150 so that the aircraft's center of gravity 330 and the cargo container's center of gravity 340 are within acceptable center-of-gravity parameters.

In the present instance the center of gravity is a consideration for the aircraft's vertical flight mode, cruise flight mode, and transition between vertical and cruise flight. Recall that a primary objective of the present invention is the transportation and delivery of cargo. To achieve this objective the attachment point(s) of the cargo container to the fuselage is configured to minimize movement of the aircraft center of gravity.

The present invention minimizes changes in the aircraft's center of gravity 330 by attaching the cargo container 150 to the fuselage 110 along the fuselage longitudinal centerline 130 using a mounting system 310, 320. Sensors, in and below the cargo container, allow the system to detect and warn an operator when the center of gravity is incorrect, to ensure the cargo pod is packed correctly for transport. These sensors enable the cargo container to determine the overall weight and the center of gravity of the current payload in the cargo container. Load cells at the corners of a separate floor piece measure applied pressure. In another embodiment sensors in the lower platform of the cargo container enable determination of the overall weight and the center of gravity of the current payload. As before, load cells at the corners of the platform measure applied pressure. The weight and weight distribution of the cargo container itself are factored into the center of gravity analysis, allowing the system to isolate the weight and the center of gravity of the payload inside. In one embodiment the center of gravity of the cargo container and the aircraft's center of gravity 330 are laterally aligned meaning that the center of gravity of the cargo container is positioned as close as possible to the longitudinal axis of the aircraft when attached to the aircraft. Similarly, the lateral position (fore and aft) of the center gravity of the cargo container is configured to closely align with center of gravity of the aircraft. The position of the container front to back in order to maintain acceptable center of gravity. By controlling these deviations, the attachment and detachment of the cargo pod minimizes flight control constraints generated by the added weight of cargo. Moreover, the design of the cargo container considers placement of cargo inside of the container to control the position of the cargo container's center of gravity to minimize impact on the aircraft center of gravity once attached.

As described herein, the present invention includes a rotor array to provide the aircraft with a VTOL capability. In a conventional helicopter a central rotor provides vertical thrust sufficient to provide the helicopter with a vertical lift capability. To counter torque produced by the single rotor and to enable the pilot to control the orientation of the helicopter's movement about the vertical axis (the direction the helicopter is pointing) helicopters include a tail rotor. The tail rotor produces thrust substantially orthogonal (laterally) to the vertical thrust component of the main rotor. By controlling the pitch of the tail rotor, the pilot is able to orient the direction the helicopter is facing.

While including one or more tail rotors as a component of the vertical stabilizers of the present invention is contemplated in one embodiment, other embodiments do not include a tail rotor equivalent or source of lateral force combined with the vertical stabilizers. Nonetheless, control of the aircraft in various flight conditions necessitates the ability to orient the aircraft. For example, one objective of the present invention is to angle into a wind during landing, to minimize the disruptive effects of gusts on control authority. Accordingly, one feature of the present invention is the ability to orient the aircraft to predetermined orientation.

Lacking a traditional tail rotor configuration, one embodiment of the present invention provides the aircraft with positive orientation control by tilting the plane of the rotor disk(s). Recall that, in one embodiment, the present invention does not include a cyclic. The plane that the rotor travels and the plane in which the thrust produced by the rotor is therefore fixed. In one embodiment of the present invention the thrust vector of one or more of the rotors in the rotor array are displaced away from the aircraft's vertical axis to create a lateral force component. Just as a cyclic tilts the rotor disk to provide variable lateral thrust vectors, the present invention, in one embodiment, mounts one or more rotors of the rotor array at angles displaced from the aircraft's vertical axis, to provide the aircraft with lateral force components.

Figure 4A:
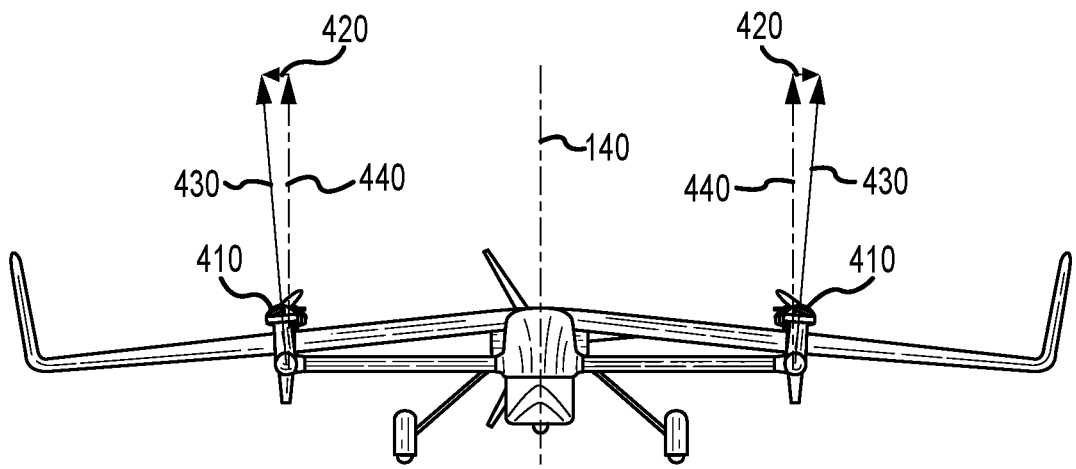
FIG. 4A and FIG. 4B show a front and top view of the compound aircraft according to one embodiment of the present invention.
Figure 4B:
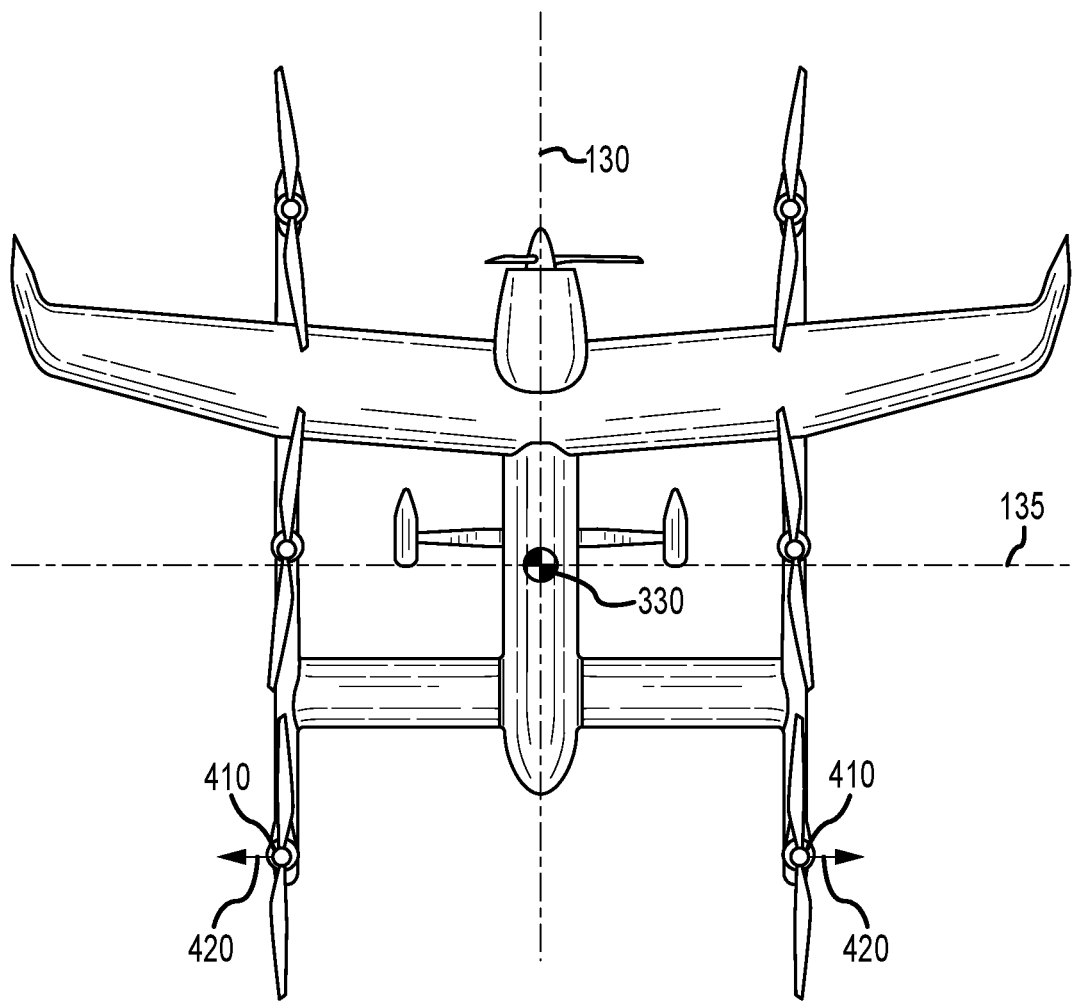

Considering the versions of the present invention in which the rotors each possess blade pitch control but not cyclic, rotors of the rotor array are mounted, in one embodiment, on the support beams at angles displaced from the vertical axis of the aircraft to provide differential lateral force. With attention directed to FIGS. 4A and 4B, a front and corresponding top view of the aircraft shows a forward pair of rotors tilted away from the aircraft's vertical axis. Each thrust vector produces a lateral component away from the vertical axis. FIG. 4A shows a rotor pair 410 located at the front of the aircraft position fore of the center of gravity 330. When both rotors are producing the same amount of thrust the lateral forces generated by each rotor will cancel each other. However, by producing a differential amount of thrust the lateral force 420 produced by one rotor will exceed that of the other rotor. As both rotors are positioned ahead of the center of gravity a differential lateral thrust causes rotation of the aircraft about the center of gravity 330. In this example, the forward position of the lateral thrust produces a moment about the center of gravity. A larger differential thrust produced by the rotor mounted on the port (left) support boom will rotate the aircraft counter clockwise. Conversely, a larger differential thrust produced by the rotor mounted on the starboard (right) support boom will rotate the aircraft clockwise. According to one embodiment of the present invention the forward pair of rotors are tilted away from the vertical axis by one (1) or more degrees, not to exceed ten (10) degrees.

Figure 5A:
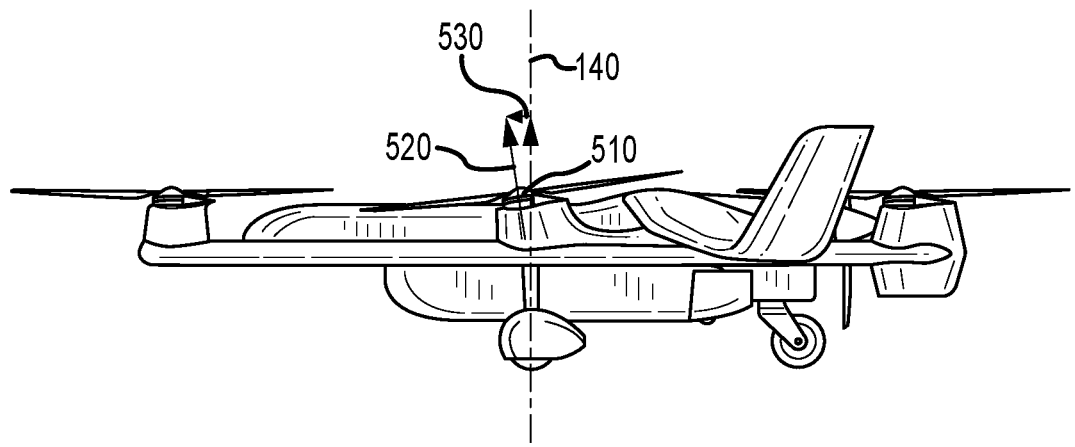
FIG. 5A and FIG. 5B show a side and top view of the compound aircraft mated with a cargo container, according to one embodiment of the present invention.

FIG. 5A is a side view of one embodiment of a compound aircraft showing a displaced thrust vector of a middle, central, pair of rotors. As with the forward pair of rotors, the middle rotor pair 510 is tilted away from a vertical axis 140 creating a moment about the center of gravity. In this instance both the port and starboard middle rotors are canted forward relative to the orientation of the aircraft. Whereas the lateral thrust components of the forward pair of rotors cancel each other (assuming equal thrust vectors) resulting in no lateral aircraft motion, the longitudinal thrust component 530 of the center pair of rotors is cumulative in the longitudinal direction. The center pair of rotors produce a component of forward thrust but in a configuration in which the forward thrust is displaced laterally from the center of gravity 330 by the lateral spacing 540 of the support boom. Accordingly, a larger differential thrust produced by the port center rotor will create a clockwise moment about the center of gravity while a larger differential thrust produced by the starboard center rotor will create a counter clockwise moment. According to one embodiment of the present invention the center pair of rotors is tilted forward from the vertical axis by one (1) or more degrees not to exceed fifteen (15) degrees. In another embodiment of the present invention the center pair of rotors is tilted aft from the vertical axis by one (1) or more degrees not to exceed fifteen (15) degrees and in yet another embodiment of the present invention the center pair of rotor are tilted in different fore/aft directions. In such an instance one rotor is tilted aft while the other rotor is tilted forward.

Figure 6A:
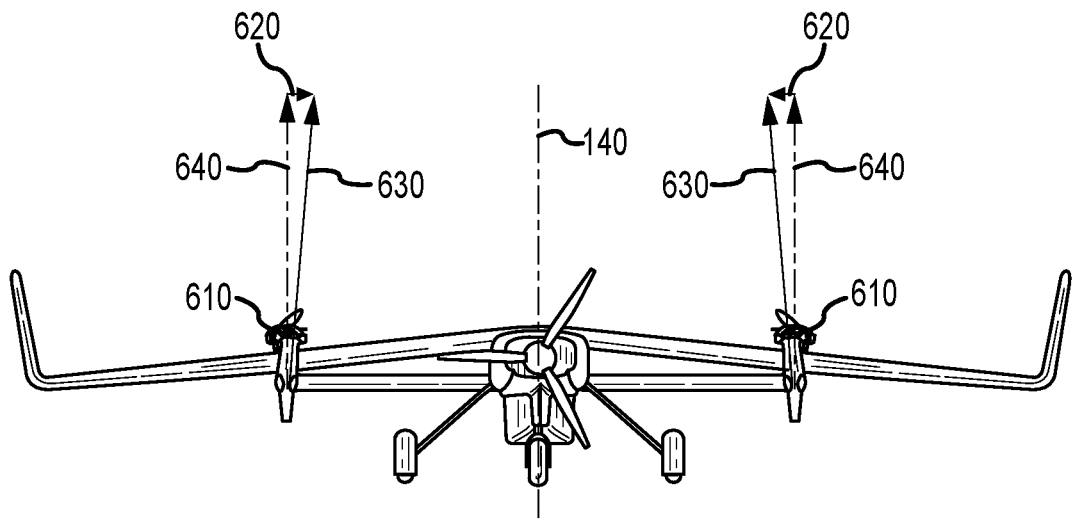
FIG. 6A and FIG. 6B show a rear and top or aft view of the compound aircraft according to one embodiment of the present invention.
Figure 6B:
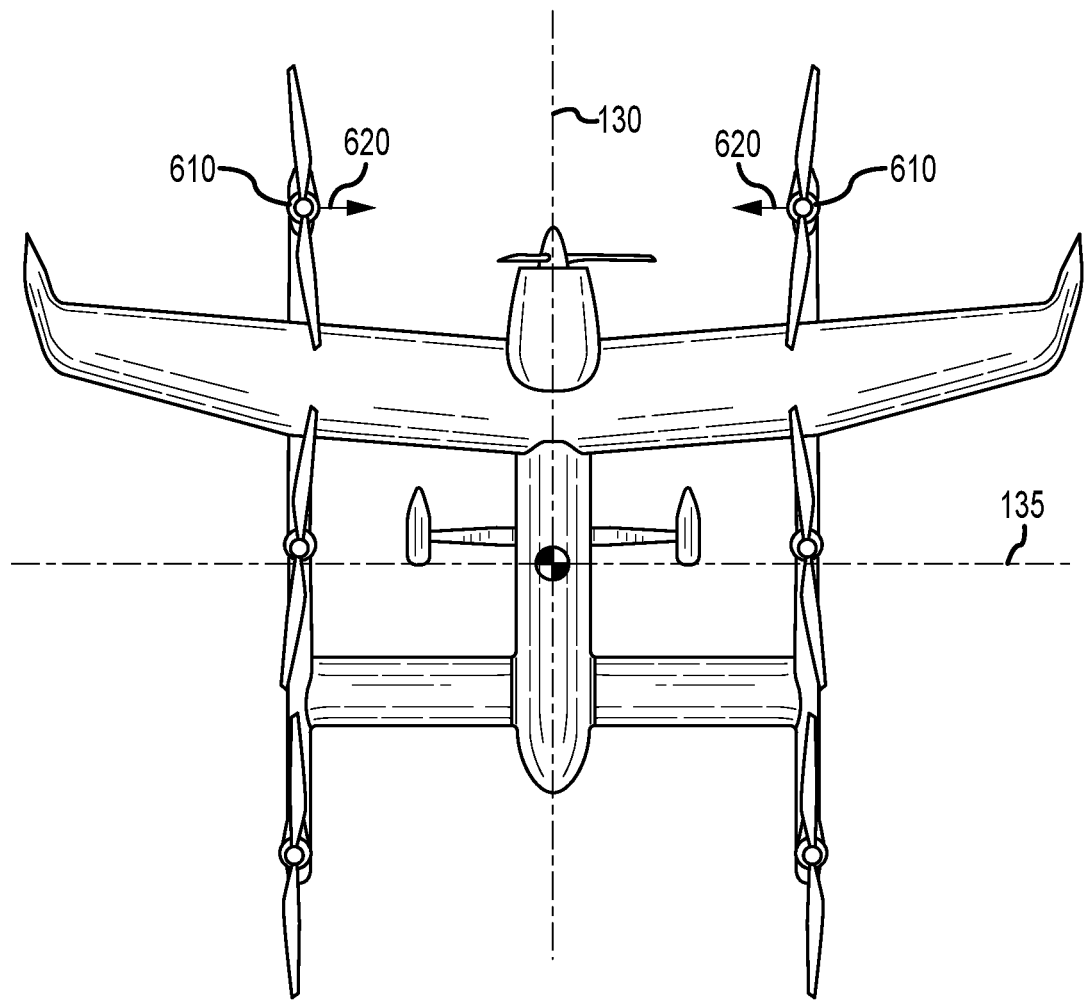

FIG. 6A is an aft view, and FIG. 6B top view of one embodiment of the compound aircraft of the present invention illustrating an angular displacement of the aft rotor pair 610. As shown, the rear or aft pair of rotors 610 of the rotor array are tilted inward toward the fuselage or longitudinal axis. When both rotors are producing the same amount of thrust 630 the lateral forces 620 generated by each rotor will cancel each other out, as with the front pair of rotors. However, by producing a differential amount of thrust the lateral force produced by one rotor will exceed that of the other rotor. As both rotors are positioned behind of the center of gravity the differential lateral thrust results in the rotation of the aircraft about the center of gravity 330. In this example, the aft position of the lateral thrust produces a moment about the center of gravity opposite of that produced by the forward pair of rotors. Recall however that the forward pair of rotors were tilted away from longitudinal axis whereas the rear rotors are tilted toward the longitudinal axis. Therefore, a larger differential thrust produced by the rotor mounted on the port (left) support boom will rotate the aircraft clockwise. Conversely, a larger differential thrust produced by the aft rotor mounted on the starboard (right) support boom will rotate the aircraft counter clockwise. According to one embodiment of the present invention the aft or rear pair of rotors is tilted toward the vertical axis by one (1) or more degrees not to exceed ten (10) degrees.

One embodiment of the present invention positions rotor pairs among two support booms. Each support boom runs parallel to the fuselage and is equidistantly offset from the fuselage. As previously described the rotors are not constrained to be equally distributed on the support boom(s). For example, with respect to the center of gravity, the forward pair of rotors can be further forward of the center of gravity than the aft pair of rotors is aft of the center of gravity, or vice versa. Moreover, the center pair of rotors is not constrained to be on the lateral axis of the aircraft. The center pair of rotors could be forward or aft of the center of gravity. And while the present invention has been described herein as using pairs of rotors that are symmetrically positioned with respect to the center of gravity, the configuration and angular deviation of each rotor can be independent.

Figure 5B:
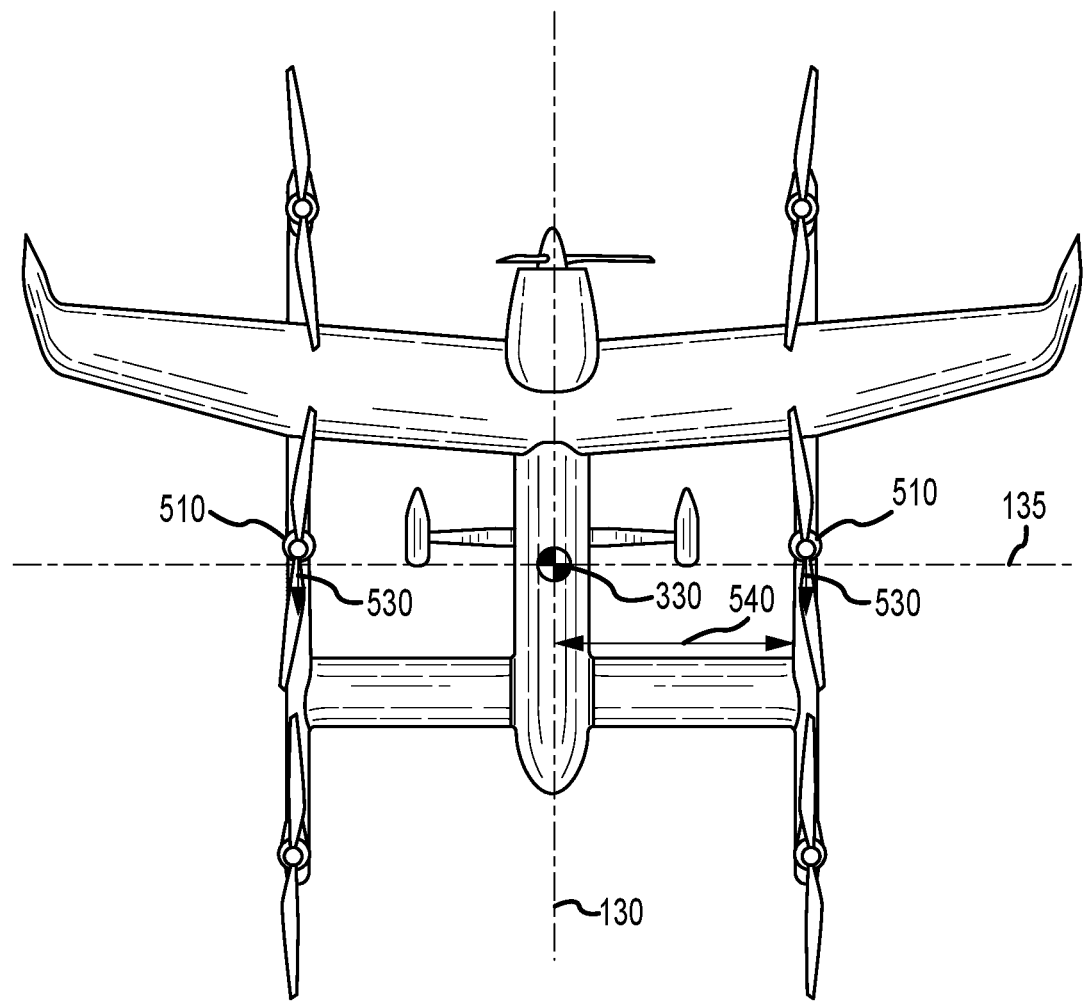

Using the configuration of the rotor array described above and as shown in FIGS. 4-6, one skilled in the relative art will recognize that the orientation of the aircraft can be manipulated by controlling various thrust outputs of each rotor independently. For example, from a stationary hover, the aircraft can be manipulated to rotate clockwise by increasing thrust on either (or both) starboard forward or aft rotor. Similarly, a counterclockwise rotation will result in increasing differential thrust from the forward or aft rotors found on the port support boom. A clockwise rotation is also the result of an increase of thrust from the port center rotor while counterclockwise rotation will occur from a differential thrust from the starboard center rotor.

The present invention also provides lateral movement of the aircraft by manipulating differential rotor thrust in various combinations. For example, a differentially larger thrust from the port forward rotor and the aft starboard rotor will produce a cumulative thrust vector directed toward the left or port side of the aircraft acting through the center of gravity with no rotational moment. Thus, in a crosswind condition in which the aircraft is experiencing a crosswind coming from left to right from the perspective of the front of the aircraft, a differential thrust input as described above would counter the crosswind to enable the aircraft to maintain in a level attitude and stationary over a fixed point.

As one of reasonable skill in the relevant art will appreciate, various combinations of thrust produced by each rotor in the rotor array, and in combination with the horizontal propulsion system, can be used to orient and maintain the aircraft over a stationary point in a variety of environmental conditions.

Figure 7:
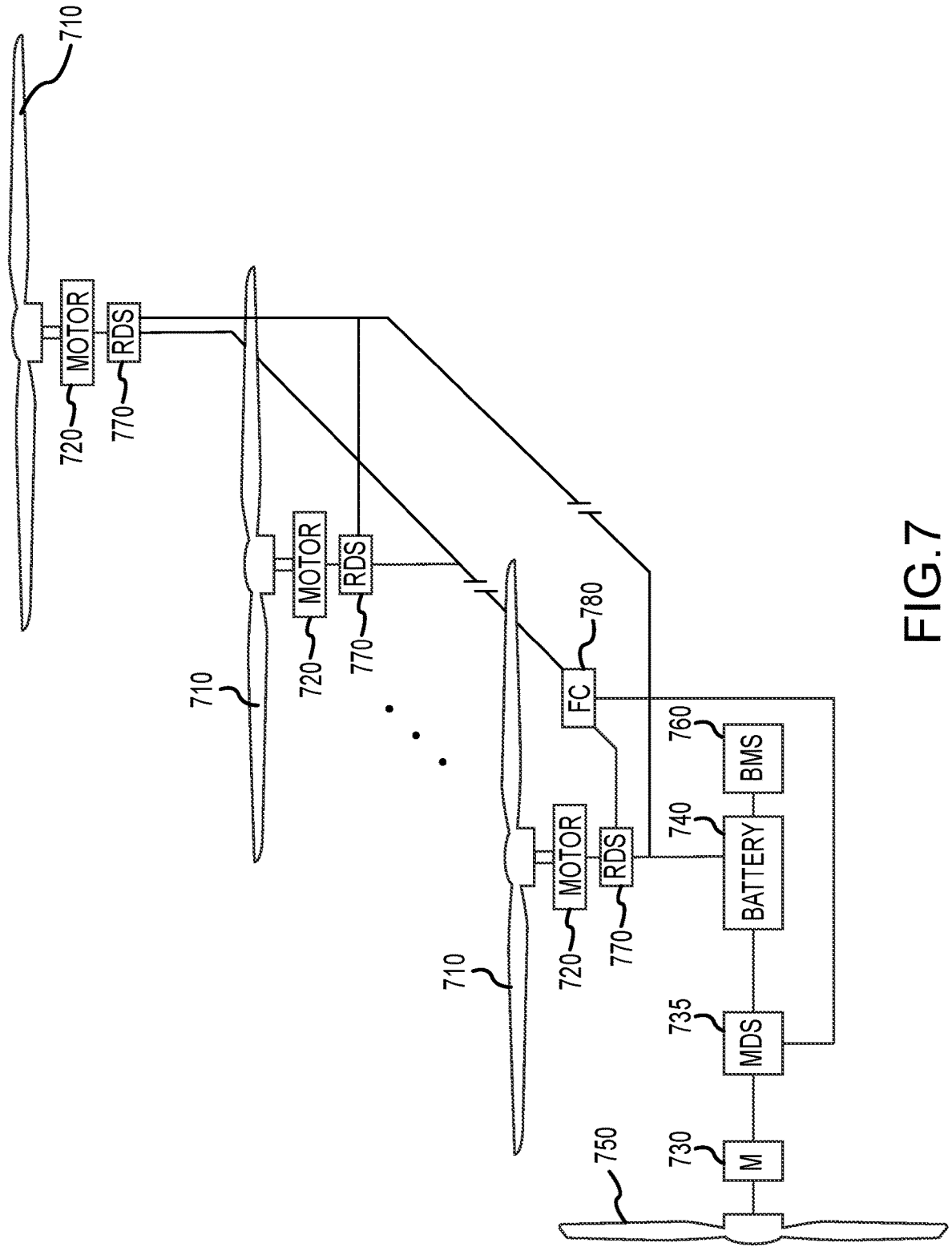
FIG. 7 is a high-level block diagram of a battery-based propulsion system for a compound aircraft according to one embodiment of the present invention.

FIG. 7 presents a high-level block diagram of a powertrain system for a compound aircraft according to one embodiment of the present invention. The powertrain system of the compound aircraft shown in FIG. 7 is a pure electrical system in which the cruise propulsion system and the rotor array are driven by motors 720, 730 powered by onboard batteries 740. Accordingly, the system shown in FIG. 7 includes a propeller 750 (fixed and/or variable pitch) rotationally coupled to a propeller motor 730. The propeller motor is communicatively coupled to a motor drive system 735 that provides revolution control of the motor, and in an embodiment that includes a variable pitch propeller with pitch control.

The motor drive system 735 is further coupled to a plurality of onboard batteries 740 which supplies power to the motor drive system 735 and ultimately to the propeller motor 730. A battery management system 760 is coupled to the plurality of batteries 740 to control the discharge rate and state of the charge of the batteries as well as manage charging.

The powertrain system of FIG. 7 also includes a plurality of rotors 710, each of which is coupled to a motor 720 and a rotor drive system 770. As with the motor drive system 735, each rotor drive system 770 provides revolution control of each rotor motor 720. Moreover, and in yet another embodiment, the rotor drive system 770 directs blade-pitch actuators to manipulate thrust produced by each rotor.

A flight control system 780 is interposed and communicatively coupled to each the rotor drive system and the motor drive system. The flight control system manipulates thrust of each rotor to provide flight control inputs during vertical flight modes of operation and modulates horizontal thrust when the aircraft in a cruise flight mode.

Figure 8:
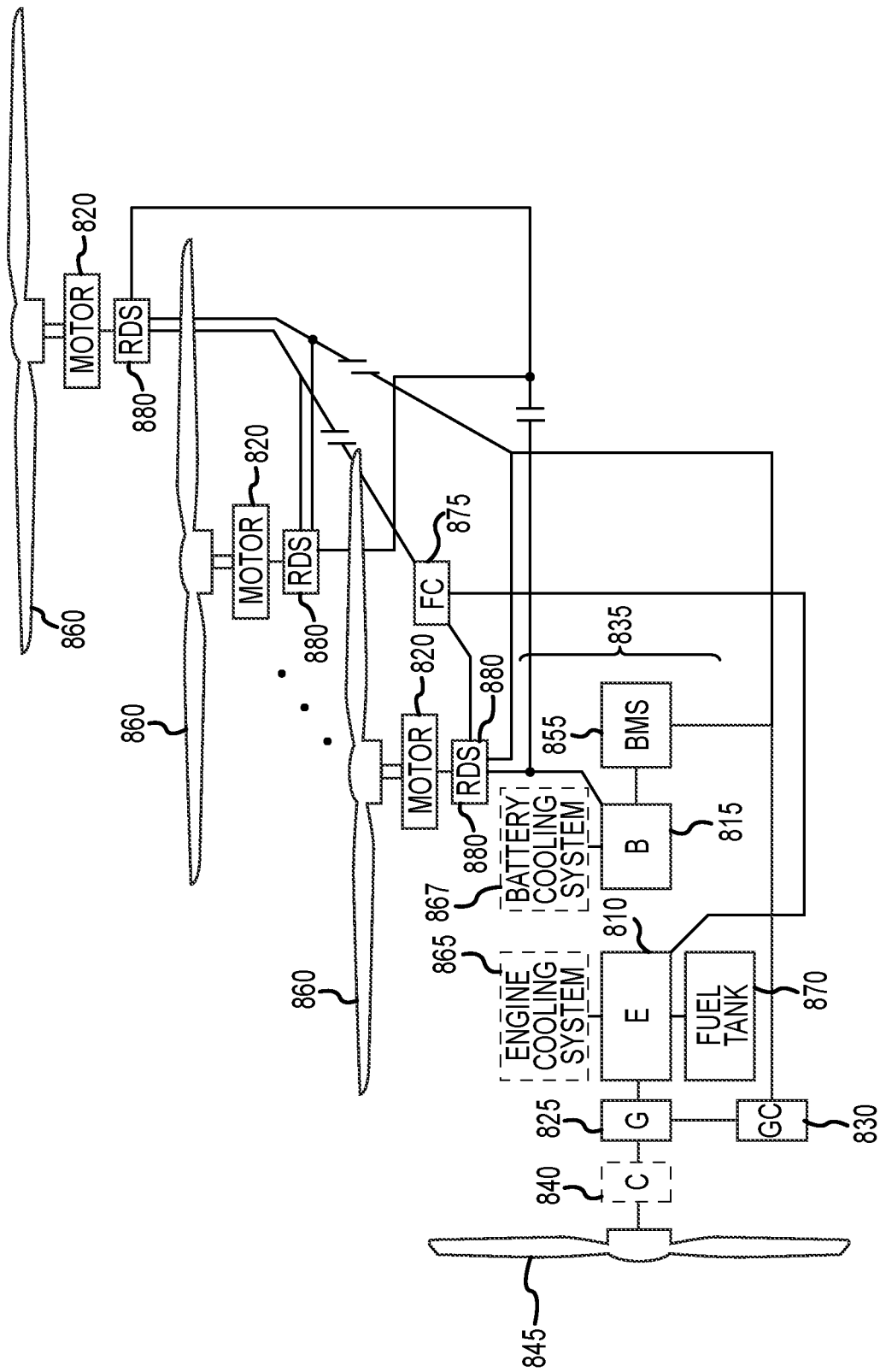
FIG. 8 is a high-level block diagram of a propulsion system for a compound aircraft utilizing battery and a liquid-fuel driven propulsion, according to one embodiment of the present invention.

FIG. 8 is a high-level system diagram of a hybrid powertrain system according to one embodiment of the present invention. The powertrain system of FIG. 8 combines energy generated by a liquid-fuel engine 810 with that of batteries 815 to drive both rotor motors 820 for vertical thrust and, in this depiction, a propeller system, for horizontal thrust. One or reasonable skill in the relevant art will recognize that the liquid-fuel propulsion system may also be turbine based and while the present invention is described and depicted as using propellers, high altitude variants of the present invention may incorporate a turbine-based propulsion system for the cruise flight mode of operation.

As shown in FIG. 8 a liquid-fuel engine 810 is coupled to a generator 825 that produces electricity as controlled by a generator controller 830 that transmits generated power to the battery system 835. In one embodiment the propeller 845 shown is decoupled from the rotation of the engine via a clutch mechanism 840, allowing the liquid-fuel engine 810 to drive the generator 825 without turning the propeller 845. The generator controller 830 is coupled to a battery management system 855 which conditions onboard batteries 815 and uses the power supplied by the generator 825 to charge/recharge the batteries 815. In other embodiments the battery management system 855 can direct electricity created by the generator 825 to motors driving the rotors 860.

In the system depicted in FIG. 8 the liquid-fuel engine 810 is coupled to the horizontal propulsion system, in this case a propeller 845. An optional clutch 840 or gearbox is interposed between the liquid-fuel engine 810 and the propeller 845 to manage propeller speed and/or engagement and disengagement of the propeller. Moreover, and according to one embodiment of the present invention, the clutch/gearbox includes actuators to control the pitch of the propeller. As will be appreciated by one of reasonable skill in the relevant art the cruise propulsion system may include a fixed pitch propeller in which thrust is directly controlled by revolutions delivered by the liquid-fuel engine via the clutch/gearbox. In other embodiments, the clutch/gearbox can maintain the propeller at a constant speed while thrust is controlled by varying the pitch of the propeller. As the propeller demands more pitch to produce more thrust the engine provides more power to the gearbox to maintain the propeller at a constant speed.

Consistent with many liquid-fuel engines, an engine cooling system 865 is incorporated to manage heat produced by the engine. The present invention includes, in one embodiment, a modular water-cooled variable pitch lift powertrain system with an individual coolant pump and heat exchanger for each set of motors and motor controllers used on the aircraft. Liquid and gaseous coolants such as 410A, glycols, glycol and water mixes, oils, oil mixes, and more are all viable means of cooling each "motor pod."

In another embodiment of the present invention the cooling system uses special cables with an inner core comprised of a hollow, thermally-conductive tubing. During operation, this variant enables the motor and motor controller to be cooled via a dedicated cooling loop for each motor. It also permits the power cables to be cooled via the same dedicated cooling loop. Cooling the power cables enables the use of smaller conductors, enabling powertrain weight reduction opportunities.

In yet another embodiment the invention uses special cables with an inner core comprised of a hollow, thermally-conductive tubing. This variant enables the motor and motor controller to be cooled while also cooling the power cables during operation.

Similarly, a fuel tank 870 supplies the needed liquid fuel. The engine 810 draws fuel from the fuel tank, which is controlled by the system's flight computer 875. In addition to the engine cooling system, the embodiment shown in FIG. 8 includes a battery cooling system. Charging and discharging batteries generates heat and heat mitigation facilitates battery system management.

Each rotor 860 of the rotor array is coupled to a motor 820 which is driven/controlled by a rotor drive system 880. The rotor drive system 880 delivers to each rotor 860 motor sufficient power to drive the motor 820 and thus drives the rotor 860 at the desired revolutions per minute. In one embodiment each rotor includes a mechanism configured to modulate the pitch of each rotor blade to vary thrust produced by the rotor given a particular revolutions per minute. In the present embodiment the rotor drive system directs both the motor, with respect to the number of revolutions per minute, and the blade-pitch actuators to create vertical thrust.

A primary objective of the present invention is to depart from a first location vertically in a vertical flight mode using the aircraft's VTOL capability, transition to a cruise flight mode thereby supporting flight using solely a horizontal propulsion system, a wing and a canard, and then return to a vertical flight mode to deliver cargo housed in a cargo container. The transition from a vertical flight mode to a cruise flight mode is not a trivial task.

The present invention departs from prior aircraft by combining the advantages of a VTOL multi-rotor design with that of a conventional aircraft. Multi-rotor designs can efficiently demonstrate VTOL capabilities but are inefficient for long range travel. Conventional aircraft using wings and/or canards to supply lift can efficiently travel long distances but are constrained to depart and arrive at fields that can support conventional landings and takeoffs.

Figure 9:
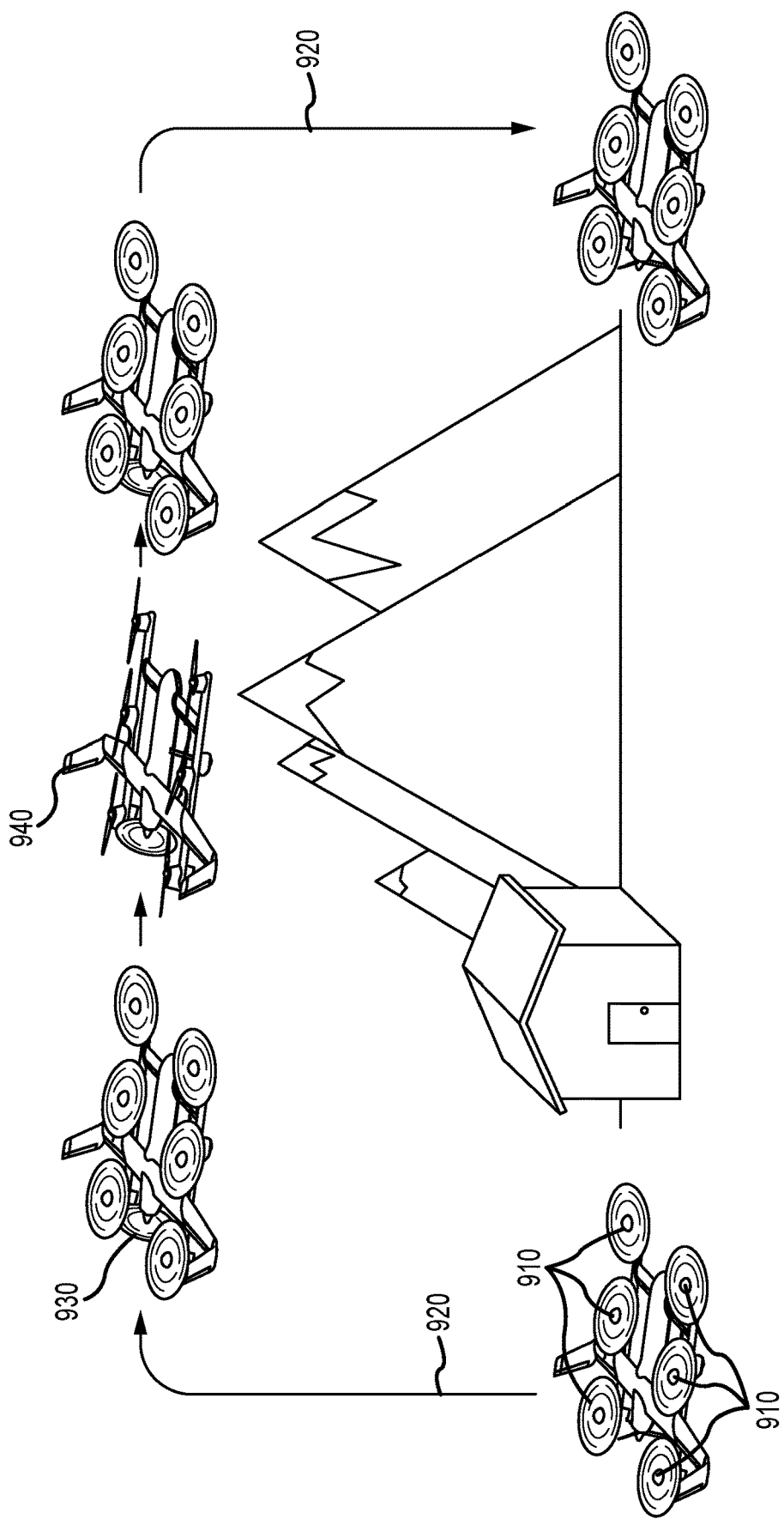
FIG. 9 is a mission profile depiction for a compound aircraft depicting a vertical ascent, transition to cruise flight, conveyance of cargo across a geographic expanse, and transition from cruise flight to vertical flight for delivery of cargo.

The present invention transitions a VTOL multi-rotor aircraft to a cruise flight mode after a vertical departure and then back to a vertical flight mode for arrival. FIG. 9 presents a general depiction of a typical mission profile for the compound aircraft of the present invention. According to one embodiment of the present invention the rotor array 910 creates sufficient vertical thrust and control authority to enable the aircraft to depart 920 from a location with a cargo container coupled to the fuselage.

As the aircraft gains altitude, the horizontal propulsion system 930, in concert with the rotor array, provides horizontal thrust to enable the aircraft to achieve a positive forward velocity. As the aircraft gains forward speed 940 the wing and canard produce lift and provide additional control authority. As cruise speed builds the rotors of the rotor array need to produce less and less lift. In a fixed pitch system lacking rotor-pitch actuation, the reduction in needed rotor lift is controlled by slowing each rotor. In an embodiment of the present invention having rotor-pitch actuation, each rotor decreases its contributory lift component by a combination of reduced rotation speed and decreasing the relative pitch of the rotor blades.

Eventually, the entirety of lift needed to support the aircraft, including the ability to ascend and descend if needed, is supplied by the wing, canard and horizontal propulsion system. No longer needing additional lift, the rotors are slowed and eventually stopped.

According to one embodiment of the present invention, each rotor pair of the rotor array stops concurrently but at a different moment than the other rotor pairs, while in other embodiments of the present invention, each rotor of the rotor array slows and stops independently. And in yet another embodiment of the present invention each rotor of the rotor array slows and stops simultaneously.

The sequence described above is reversed as the compound aircraft transitions from a cruise flight mode 940 to a vertical flight mode 920. A significant aspect of the slowing and stopping of the rotors during the transition process is the position of each rotor.

As will be appreciated by one of reasonable skill in the relevant art, as the compound aircraft reaches a cruise mode flight velocity, random or uncontrolled movement of one or more rotors can provide spurious flight control inputs that could render the aircraft uncontrollable. To mitigate this possibility each rotor is stopped and aligned (clocked) into an aerodynamic streamlined position.

According to one embodiment of the present invention each rotor of the rotor array is stopped to align with the support boom on which it resides. Each support boom is substantially parallel with the longitudinal axis of the aircraft, thus, in a cruise flight mode, each rotor is stop and clocked into a position parallel with the longitudinal axis of the aircraft.

Figure 10:
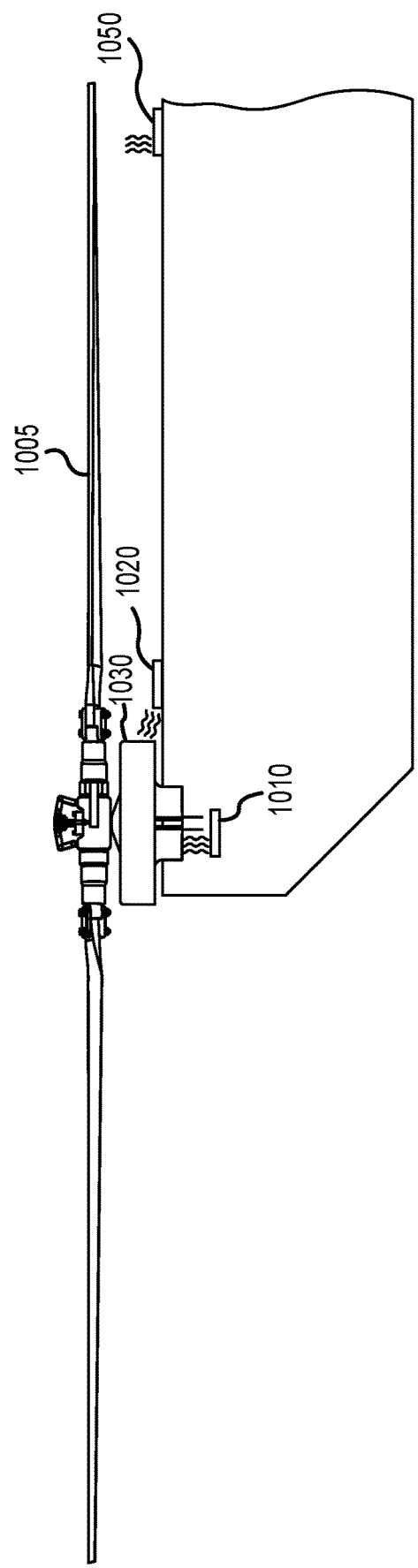
FIG. 10 shows a plurality of sensor configurations for identifying the position of a rotor with respect to a support structure according to one embodiment of the present invention.

Aligning each rotor with the support boom/longitudinal axis requires knowledge of the position of each rotor blade. According to one embodiment of the present invention, each rotor and rotor drive system includes a sensor that can detect the position or phase of the rotor as it revolves. FIG. 10 presents three embodiments of sensor positions contemplated by the present invention.

FIG. 10 presents a first position encoder 1010 on a rotating part of the motor 1030. As the motor 1030 rotates, a sensor/encoder detects the phase of the motor, and as the motor is directly coupled to the rotor 1005, detects the phase of the rotor blade. Knowing the exact phase of the motor 1030, the rotor drive system can stop the motor 1030 to align the phase of the motor, and the rotor blade 1005, with the longitudinal axis.

FIG. 10 presents a second embodiment in which an encoder is positioned opposite the rotor 1020 yet still monitors the motor position. As with the system above, the encoder senses the rotational phase of the motor 1030 and through communication with the rotor drive system, stops the rotor 1005 when it is at the correct position. FIG. 10 lastly shows a proximity sensor 1050 on a structural boom that senses the position of the rotor as the rotor blade passes overhead. This type of sensor detects the presence of the rotor 1005 as it passes by the support boom. In this embodiment, the control system uses this information to determine the motor's rotational speed and phase and stops the rotor when it is at the correct position. This last sensor embodiment 1050 is the only direct measure of the rotor's 1005 position with respect to the support boom and longitudinal axis. The other methods to identify the position of the rotor rely on a known correlation between the phase of the motor and the position of the rotor blades.

Figure 11:
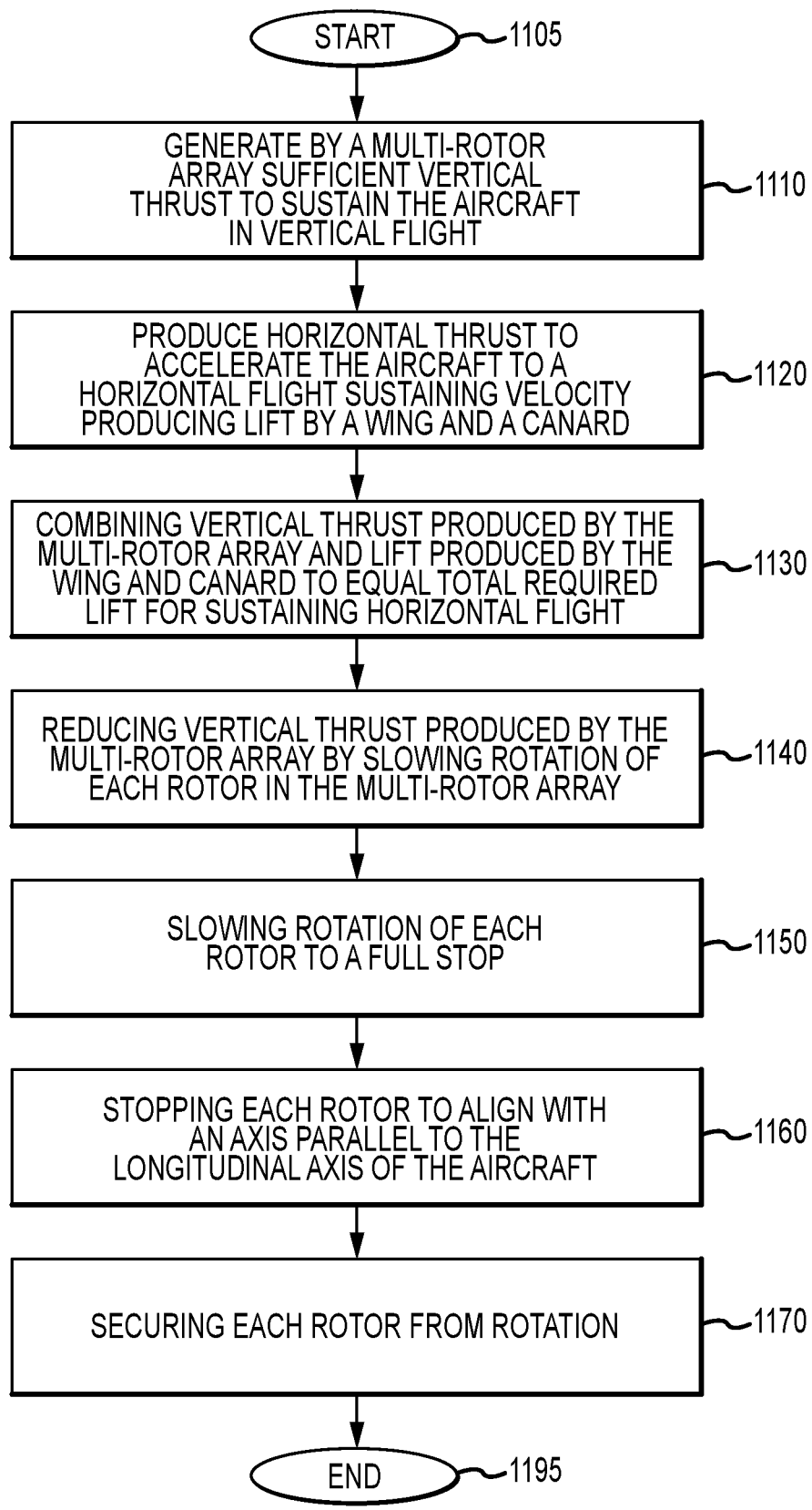
FIG. 11 is one embodiment of a method, according to the present invention, for transitioning a compound aircraft from a vertical flight mode to a cruise flight mode.
Figure 12:
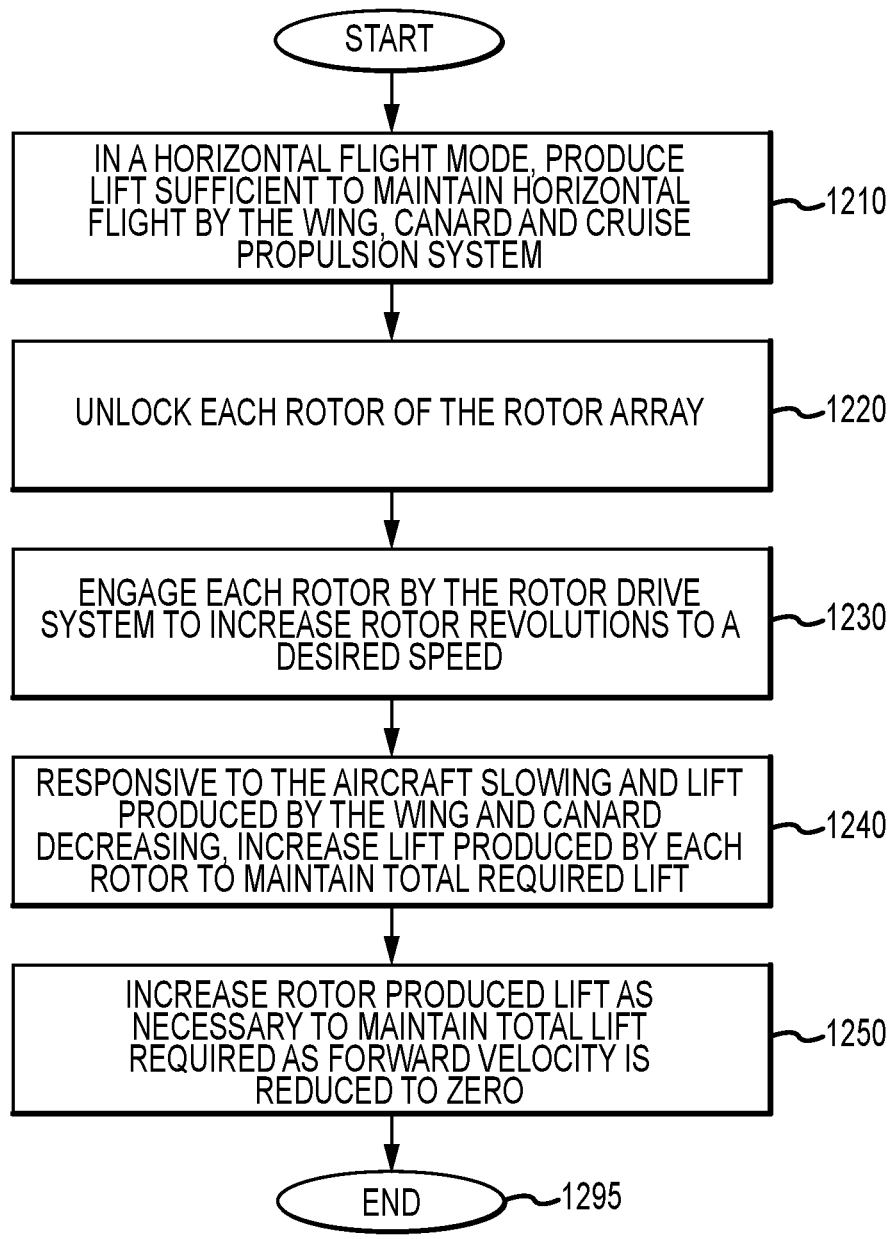
FIG. 12 is one embodiment of a method, according to the present invention, for transitioning a compound aircraft from a cruise flight mode to a vertical flight mode.

FIGS. 11 and 12 are flowcharts depicting examples of the methodology which may be used to transition a compound aircraft of the present invention from a vertical flight mode to a cruise flight mode and from a cruise flight mode to a vertical flight mode, respectively. In the following description, it will be understood that each block of the flowchart illustrations, and combinations of blocks in the flowchart illustrations, can be implemented by computer program instructions directed to or by the flight control system. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

As illustrated by FIG. 11, transition from vertical flight to cruise flight begins 1105 by generating 1110 sufficient vertical thrust by the rotor array to sustain the aircraft in a vertical flight mode. Once vertical flight is achieved, the horizontal propulsion system produces 1020 thrust to accelerate the aircraft enabling the wing and the canard to product lift sufficient to support the aircraft.

As the aircraft accelerates vertical thrust provided by the rotor array is combined 1130 with lift produced by the wing and canard to equal total required lift. As the lift generated by the wing and canard grows, thrust produced by the rotor array is reduced 1140, in one embodiment, by reducing the blade pitch of each rotor.

Eventually, lift produced by the wing and canard is sufficient to sustain a cruise flight mode including ascents, descents and other maneuvers consistent with a fixed wing aircraft. At this time the rotors are slowed 1150 to a full stop and do not produce any substantial lift.

The position or phase of each rotor is monitored and controlled to stop 1160 the rotor to longitudinally align with the support boom on an axis parallel with the longitudinal axis of the aircraft. Once stopped and aligned with the longitudinal axis, the rotors are secured 1170 in place using, in one embodiment, the magnetic cogging properties of the motor ending 1195 the process.

FIG. 12 presents a flowchart for a methodology to transition the compound aircraft of the present invention from a cruise flight mode to a vertical flight mode. The method begins 1205 while the aircraft is in a cruise flight mode and operating as a fixed wing aircraft. The canard, wing and horizontal propulsion system produce 1210 sufficient lift to sustain the aircraft in level flight. Nearing the desired destination, and as the aircraft slows below a predetermined speed, yet above a minimum speed for controlled flight, the rotor drive system unlocks 1220 each rotor.

With the rotors unlocked and free to rotate, the rotor drive system engages 1230 each motor to increase its rotation to a desired rate. During this process the blade pitch of each rotor (in embodiments employing variable pitch) is modulated so as to produce vertical lift, as the lift produced by the canard and wing decreases 1240 and lift production is shifted from the wing and canard to the rotor array. In embodiments in which a fixed pitch rotor blade is employed the rotor speed is modulated to produce lift as required to supplement that produced by the wing and canard to equal, when combined with the wing and canarad, total life required.

To compensate the flight control system in conjunction with each rotor direct system increases 1250 pitch to the rotor array to create vertical thrust. As forward velocity continues to decrease the total lift component is supplied by the rotor array until the aircraft enters its vertical flight mode and can accomplish VTOL operations, ending the transition process 1295.

Figure 13:
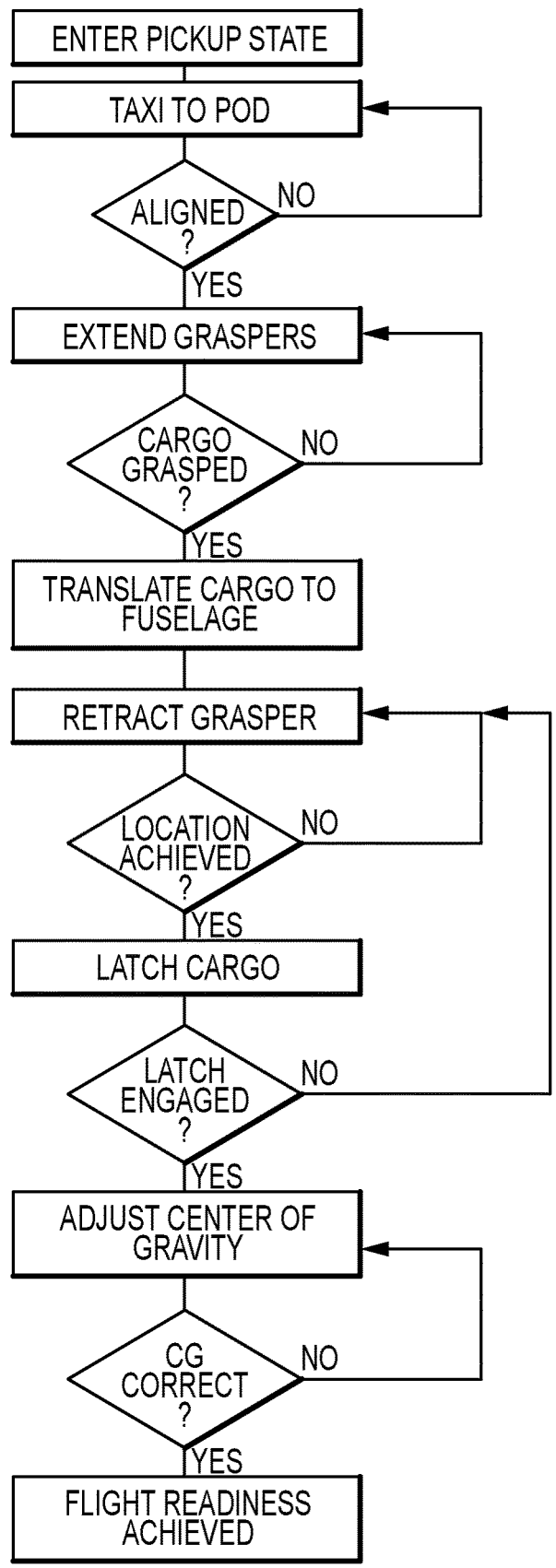
FIG. 13 is one embodiment of a method, according to the present invention, for identification, uploading and flight readiness compliance.

FIG. 13 is a flowchart depicting an example of the methodology which may be used to adjust the cargo container's center of gravity. As discussed above, the aircraft maneuvers to align the aircraft's longitudinal axis with that of the cargo container. The cargo container is then grasped and an assessment of the cargo's center of gravity relative to the aircraft's center of gravity is made, to determine whether the centers-of-gravity are within acceptable limits. If they are not, the graspers are released and then re-grasp the cargo container to achieve acceptable center-of-gravity parameters. The cargo container is then secured to the aircraft and flight readiness is thus achieved.

Embodiments of the present invention, disclosed herein, present a compound aircraft having an array of rotors for vertical flight positioned on support booms combined with wing elements for cruise flight. A central fuselage, coupled to the wing and canard, houses avionics and a pusher propeller for forward propulsion. The aircraft of the present invention accommodates a cargo-carrying container with mating of the surfaces between container and fuselage and latching mechanisms for attaching and detaching the container and vehicle. Using the aircraft's VTOL capability, the present invention departs from a location, inclusive of cargo, vertically, transitions from a VTOL mode of flight to a conventional fixed-wing mode of flight, transports the cargo over substantial distances, and thereafter re-engages its rotor array to transition back a VTOL capability for cargo delivery.

In one embodiment of the present invention, an aircraft capable of fixed-wing and rotor-based flight modes, includes:
  a fuselage wherein the fuselage includes a front portion and a rear portion and wherein the fuselage includes a longitudinal axis extending through the front portion and the rear portion;
  a wing coupled to the fuselage;
  a first support boom coupled to the wing and a second support boom coupled to the wing wherein the fuselage is positioned equidistant between the first support boom and the second support boom and wherein the first support boom and the second support boom are parallel to the longitudinal axis;
  a rotor array distributed among the first support boom and the second support boom wherein the rotor array provides substantially vertical thrust; and
  a propulsion system configured to provide thrust substantially aligned with the longitudinal axis.

Additional attributes of such an aircraft can include:
  wherein the aircraft is unmanned;
  wherein the wing is swept aft
  a canard wherein the canard is coupled to the fuselage, the first support boom and the second support boom;
wherein the wing is mounted on an upper portion of the fuselage;
wherein the canard is mounted on a lower portion of the fuselage;
wherein the wing and the canard include control elements for cruise flight;
wherein the rotor array provides alternative flight control for cruise flight;
wherein the wing includes an anhedral angle greater than zero;
wherein each the first support boom and the second support boom include a vertical stabilizer;
wherein each rotor drive system includes a motor and a motor controller;
wherein the rotor array includes a first plurality of motors mounted on the first support boom and a second plurality of motors mounted on the second support boom;
wherein each rotor of the rotor array is independently controlled by a flight control system;
wherein a rotational position of each rotor of the rotor array is controlled by the flight control system;
wherein the aircraft remains operational with failure of two or less rotors of the rotor array;
wherein the rotor array includes a plurality of rotors and during cruise flight the rotation of each rotor of the rotor array is stopped and each rotor is aligned to be parallel to the longitudinal axis;
wherein each rotor upon being stopped and aligned with the longitudinal axis is cogged;
wherein each rotor is associated with a sensor identifying the position of each rotor;
wherein each rotor, responsive to being stopped and aligned with the longitudinal axis, is held in position by its rotor drive system;
wherein the first plurality of motors is mounted along a first axis parallel to the longitudinal axis and the second plurality of motors are mounted along a second axis parallel to the longitudinal axis;
wherein the propulsion system includes a liquid-fuel powered engine and wherein the liquid-fuel powered engine is coupled to a variable pitch propeller providing thrust;
wherein interposed between the variable pitch propeller and the liquid-fuel powered engine is a clutch configured to engage and disengage the propeller;
wherein the propulsion system is a liquid-fuel, turbine-based, powered engine providing thrust;
wherein each rotor pair is tilted a different direction;
wherein the propulsion system is capable of sustaining the aircraft in a cruise flight mode including level flight, ascending flight and descending flight;
wherein the propulsion system is coupled to a generator and wherein the generator is configured to provide energy to a battery management system;
wherein the aircraft can only operate independent of the generator in cruise flight mode;
wherein thrust developed by the rotor array is distinct from thrust developed by the propulsion system;
wherein a canard coupled to the fuselage, the first support boom and the second support boom;
wherein the rotor array includes a first plurality of rotor motors mounted on the first support boom and a second plurality of rotor motors mounted on the second support boom;
wherein the rotor array includes a plurality of rotor pairs and wherein each rotor pair is tilted away from a vertical axis, the vertical axis being perpendicular to the lateral axis and the longitudinal axis and wherein each rotor pair of the multi-rotor system is tilted a different direction;
wherein the propulsion system is a propeller driven by an electric motor; and
a flight control system configured to transition the aircraft from vertical flight to cruise flight and from cruise flight to vertical flight.

One method for transitioning an aircraft from a cruise flight mode to a vertical flight mode, in which the aircraft includes a multi-rotor system having a plurality of rotors, each rotor having variable pitch, capable of sustaining the aircraft in the vertical flight mode, and a liquid-fuel system capable of sustaining the aircraft in the cruise flight mode when combined with a wing and a canard, includes:
producing by the liquid-fuel system sufficient cruise thrust to maintain the aircraft in the cruise flight mode;
releasing each rotor from a secured position to allow the rotors to rotate;
generating by the multi-rotor system vertical thrust from the rotors;
responsive to deceleration of the aircraft, combining lift produced by the multi-rotor system and lift produced by the wing and canard to equal total required lift; and
adjusting pitch angle of each rotor during cruise deceleration to provide sufficient thrust from the multi-rotor system to sustain the aircraft in the vertical flight mode Additional features of such a methodology include:
wherein the aircraft maintains level flight at a cruise-flight-sustaining velocity without aid from the multi-rotor system;
wherein the aircraft maintains level flight in the vertical flight mode with aid from the liquid fuel system;
configuring the multi-rotor system with variable-pitch rotors;
sensing by a sensor position of each rotor; and
wherein a rotor pair includes a first rotor on a first support boom and a second rotor on a second support boom, and responsive to sensing the position of each rotor, releasing each rotor pair independently.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

While there have been described above the principles of the present invention in conjunction with a compound aircraft system and its associated methodology, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. An aircraft capable of fixed-wing and rotor flight modes, the aircraft comprising:
   a fuselage, wherein the fuselage includes a front portion and a rear portion, and wherein the fuselage includes a longitudinal axis of the aircraft extending through the front portion and the rear portion, wherein the aircraft includes an aircraft center-of-gravity;
   a detachable cargo container having a detachable cargo container center-of-gravity, and wherein the detachable cargo container includes one or more sensors configured to autonomously detect data indicative of an overall detachable cargo container weight and the detachable cargo container center-of-gravity; and
   wherein the fuselage includes a mounting system, the mounting system having a winch, an adjustment apparatus, and at least one controller for controlling movement of the winch and the adjustment apparatus, wherein the mounting system:
      receives, from the one or more sensors, the data indicative of the overall detachable cargo container weight and the detachable cargo container center-of gravity,
      couples the detachable cargo container to an exterior portion of the fuselage, and
      based on the received data, autonomously adjusts a position of the detachable cargo container fore and aft along the longitudinal axis such that the aircraft center-of-gravity and the detachable cargo container center-of-gravity are aligned;
   a wing coupled to the fuselage;
   a first support boom coupled to the wing and a second support boom coupled to the wing wherein the fuselage is positioned equidistant between the first support boom and the second support boom and wherein the first support boom and the second support boom are parallel to the longitudinal axis;
   a propulsion system configured to provide thrust substantially aligned with the longitudinal axis; and
   a rotor array distributed among the first support boom and the second support boom wherein the rotor array provides substantially vertical thrust and wherein each rotor includes a rotor pitch mechanism to change rotor pitch angle and a rotor attitude mechanism to change rotor attitude and wherein the rotor array includes two or more rotor pairs, each rotor pair having a first rotor on the first support boom and a second rotor on the second support boom, characterized in that wherein each rotor in at least one rotor pair is mounted at an angle tilted away at an equal but opposite fore and aft angle from a vertical axis parallel to a vertical axis of the aircraft wherein the rotor attitude is configured to be operationally varied and, in that each rotor in at least one other rotor pair is mounted at another angle tilted away at an equal but opposite left and right angle from the vertical axis parallel to a vertical axis of the aircraft wherein the rotor attitude of the other rotor pair is configured to be operationally varied, the vertical axis of the aircraft being perpendicular to a lateral axis of the aircraft and to the longitudinal axis.

2. The aircraft of claim 1, wherein the aircraft center-of-gravity remains substantially unchanged when the detachable cargo container is attached to the mounting system and when the detachable cargo container is detached from the mounting system.

3. The aircraft of claim 1, wherein each rotor is associated with a rotor drive system.

4. The aircraft of claim 3, wherein each rotor drive system includes a motor, and each motor is coupled to a battery system and wherein the propulsion system includes a generator and wherein each motor receives power from the battery system and the generator.

5. The aircraft of claim 1, wherein the propulsion system is a liquid-fuel engine capable of sustaining the aircraft in a cruise flight mode independent of the rotor array.

6. The aircraft of claim 5, wherein the liquid-fuel engine provides thrust sufficient to sustain the aircraft in the cruise flight mode without aid from the rotor array system.

7. The aircraft of claim 6, wherein the liquid-fuel engine is coupled to a generator and wherein the generator is configured to provide energy to a battery management system and/or directly to the rotor array system.

8. The aircraft of claim 7, wherein thrust sufficient to sustain the aircraft in the vertical flight is based on an energy contribution from the liquid-fuel engine and the battery management system.

9. The aircraft of claim 1, further comprising a flight control system configured to transition the aircraft from the vertical flight mode to the cruise flight mode and from the cruise flight mode to the vertical flight mode.

10. The aircraft of claim 1, further comprising
    an independent sensor associated with each rotor, the sensor configured for sensing a position of each rotor in the rotor array; and
    a rotor drive system configured to, responsive to sensing the position of each rotor, stop each rotor independently.

11. The aircraft of claim 1, wherein each rotor of the multi-rotor array has variable pitch.

* * * * *